(12) United States Patent
Zerna et al.

(10) Patent No.: US 12,375,581 B2
(45) Date of Patent: Jul. 29, 2025

(54) TRANSMITTER AND RECEIVER, SERIALIZER AND DESERIALIZER AND METHODS FOR TRANSMITTING AND RECEIVING, SERIALIZING AND DESERIALIZING

(71) Applicant: Fraunhofer-Gesellschaft zur Foerderung der angewandten Forschung e.V., Munich (DE)

(72) Inventors: Conrad Zerna, Erlangen (DE); Peter Nagel, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 508 days.

(21) Appl. No.: 17/470,853

(22) Filed: Sep. 9, 2021

(65) Prior Publication Data
US 2021/0409510 A1    Dec. 30, 2021

Related U.S. Application Data

(63) Continuation of application No. PCT/EP2020/056679, filed on Mar. 12, 2020.

(30) Foreign Application Priority Data

Mar. 12, 2019 (EP) ..................... 19162242

(51) Int. Cl.
*H04L 67/60* (2022.01)
*H04L 12/70* (2013.01)
(Continued)

(52) U.S. Cl.
CPC ...... *H04L 67/60* (2022.05); *H04L 2012/5641* (2013.01); *H04L 47/50* (2013.01); *H04L 47/625* (2013.01)

(58) Field of Classification Search
CPC ....... H04L 67/60; H04L 47/50; H04L 47/625; H04L 2012/5641; H04L 47/621; H04L 47/6235
See application file for complete search history.

(56) References Cited

U.S. PATENT DOCUMENTS

| | | |
|---|---|---|
| 5,844,890 A | 12/1998 | Delp et al. |
| 6,016,305 A | 1/2000 | Borst et al. |

(Continued)

FOREIGN PATENT DOCUMENTS

| | | |
|---|---|---|
| CN | 1194522 A | 9/1998 |
| CN | 201156753 Y | 11/2008 |

(Continued)

*Primary Examiner* — Mounir Moutaouakil
(74) *Attorney, Agent, or Firm* — Perkins Coie LLP; Michael A. Glenn

(57) ABSTRACT

An apparatus for transmitting a plurality of data streams is provided, having a scheduling unit for selecting a data stream as a selected data stream and a transmission unit for transmitting the selected data stream. The scheduling unit is configured to select the selected data stream depending on scheduling information and a counter value, the scheduling information having a plurality of scheduling elements. A data stream is assigned to each scheduling element, wherein the data stream information of the scheduling element is data stream information for the data stream assigned to the scheduling element. A selection criterion is fulfilled or not fulfilled depending on the selection information of each scheduling element and the counter value. Depending on an order of the plurality of scheduling elements, the scheduling unit is configured to select, as the selected data stream, a data stream, which is assigned to a selection element, for which the selection criterion is fulfilled. The scheduling unit is configured to determine for at least one scheduling element, whether or not the selection criterion is fulfilled.

34 Claims, 19 Drawing Sheets

| | | | | | |
|---|---|---|---|---|---|
| | counter_min=0 | | | | |
| | counter_max=2 | | | | |
| | Line_min=0 | | | | |
| | Line_max=2 | | | | |
| Line | Slot-Mask | Slot-Value | PortID | streamID | targetNode |
| 0 | 0000_0010 | 0 | 2 | 1 | 4 |
| 1 | 0000_0011 | 3 | 1 | 2 | 4 |
| 2 | 0000_0011 | 2 | 3 | - | - |
| 3 | | | | | |
| ... | | | | | |
| 255 | | | | | |

(51) Int. Cl.
*H04L 47/50* (2022.01)
*H04L 47/625* (2022.01)

(56) References Cited

U.S. PATENT DOCUMENTS

| | | | | |
|---|---|---|---|---|
| 6,101,193 | A | 8/2000 | Ohba | |
| 6,646,986 | B1 | 11/2003 | Beshai | |
| 6,975,638 | B1 | 12/2005 | Chen et al. | |
| 7,342,936 | B2* | 3/2008 | Zhao | H04L 47/527 |
| | | | | 370/429 |
| 7,349,405 | B2* | 3/2008 | Deforche | H04L 47/527 |
| | | | | 370/468 |
| 7,580,355 | B2* | 8/2009 | Zhao | H04L 47/50 |
| | | | | 370/230.1 |
| 7,599,381 | B2* | 10/2009 | Shoham | H04L 47/564 |
| | | | | 370/413 |
| 7,724,738 | B2* | 5/2010 | Chao | H04L 49/10 |
| | | | | 370/432 |
| 7,764,689 | B2* | 7/2010 | Bernick | H04L 45/34 |
| | | | | 370/392 |
| 7,764,717 | B1 | 7/2010 | Yu et al. | |
| 7,792,118 | B2* | 9/2010 | Chao | H04L 49/1523 |
| | | | | 370/428 |
| 7,852,829 | B2* | 12/2010 | Chao | H04L 49/552 |
| | | | | 370/413 |
| 7,894,343 | B2* | 2/2011 | Chao | H04L 49/3018 |
| | | | | 370/235 |
| 8,077,607 | B2* | 12/2011 | Raszuk | H04L 45/306 |
| | | | | 370/229 |
| 8,472,322 | B2* | 6/2013 | Black | H04L 1/20 |
| | | | | 370/235 |
| 8,588,243 | B2* | 11/2013 | Yang | H04L 47/6295 |
| | | | | 370/428 |
| 8,611,467 | B2* | 12/2013 | Ali | H04B 1/30 |
| | | | | 375/319 |
| 8,711,871 | B2* | 4/2014 | Venables | H04L 47/623 |
| | | | | 370/412 |
| 9,065,777 | B2* | 6/2015 | Stanwood | H04L 47/62 |
| 9,065,779 | B2* | 6/2015 | Stanwood | H04L 47/623 |
| 9,264,747 | B2* | 2/2016 | Hou | H04L 43/0882 |
| 9,467,387 | B2* | 10/2016 | Phillips | H04L 65/80 |
| 9,906,458 | B2* | 2/2018 | Phillips | H04L 65/612 |
| 10,097,478 | B2* | 10/2018 | To | H04L 47/783 |
| 10,581,742 | B2* | 3/2020 | Liang | H04L 47/50 |
| 10,873,513 | B2* | 12/2020 | Toshniwal | H04L 41/12 |
| 11,106,496 | B2* | 8/2021 | Ghosh | G06F 9/5038 |
| 11,310,164 | B1* | 4/2022 | Korman | H04L 47/6225 |
| 2003/0179774 | A1 | 9/2003 | Saidi et al. | |
| 2004/0073694 | A1* | 4/2004 | Frank | H04L 47/24 |
| | | | | 370/412 |
| 2007/0099578 | A1* | 5/2007 | Adeney | H04B 7/10 |
| | | | | 455/25 |
| 2008/0259799 | A1* | 10/2008 | van Beek | H04N 21/2662 |
| | | | | 370/252 |
| 2012/0327879 | A1 | 12/2012 | Stadelmeier et al. | |

FOREIGN PATENT DOCUMENTS

| | | |
|---|---|---|
| CN | 102783050 A | 11/2012 |
| CN | 103931261 A | 7/2014 |
| JP | H1084383 A | 3/1998 |
| JP | H10303935 A | 11/1998 |
| JP | 2002354023 A | 12/2002 |
| JP | 2003509902 A | 3/2003 |
| JP | 2004064159 A | 2/2004 |
| JP | 2005033408 A | 2/2005 |
| JP | 2012090241 A | 5/2012 |
| WO | 0119028 A3 | 1/2002 |
| WO | 2013070138 A1 | 5/2013 |

* cited by examiner

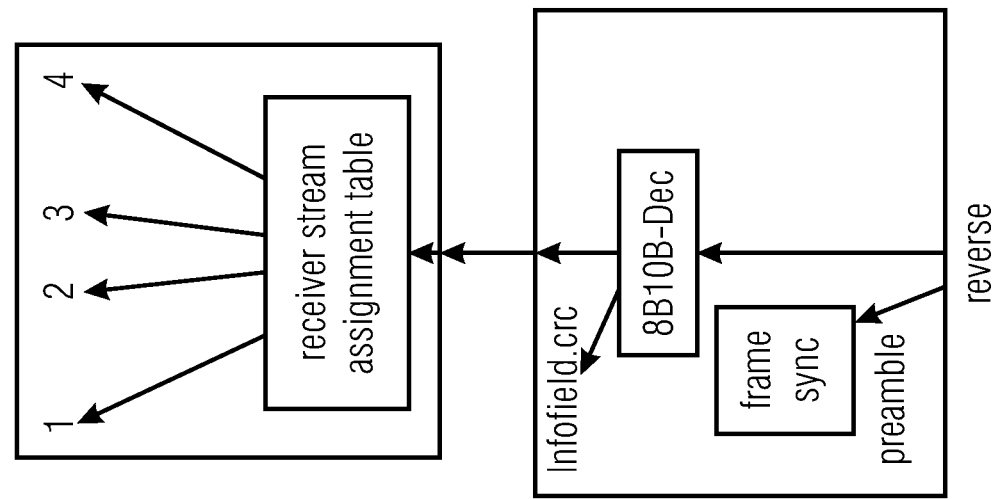
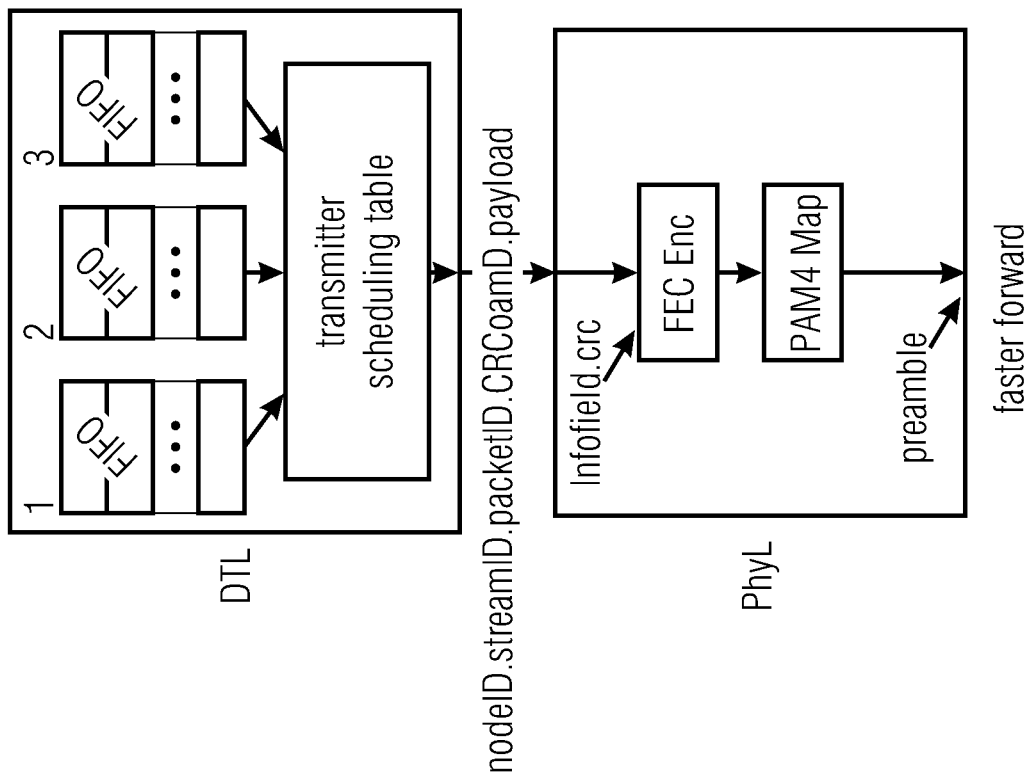
Fig. 5

| | | |
|---|---|---|
| StartFrame | | |
| header | | |
| Payload | | commands |
| | | address |
| | | data |
| EndFrame | | |

Fig. 7

| Line | Slot-Mask | Slot-Value | PortID | streamID | targetNode |
|------|-----------|------------|--------|----------|------------|
|      |           |            | counter_min=0 |    |         |
|      |           |            | counter_max=2 |    |         |
|      |           |            | Line_min=0    |    |         |
|      |           |            | Line_max=2    |    |         |
| 0    | 0000_0010 | 0          | 2      | 1        | 4          |
| 1    | 0000_0011 | 3          | 1      | 2        | 4          |
| 2    | 0000_0011 | 2          | 3      | -        | -          |
| 3    |           |            |        |          |            |
| ...  |           |            |        |          |            |
| 255  |           |            |        |          |            |

Fig. 8

| Line | Slot-Mask | Slot-Value | PortID |
|------|-----------|------------|--------|
| 0 | 0000_0010 | 0 | 2 |
| 1 | 0000_0011 | 3 | 1 |
| 2 | 0000_0011 | 2 | 3 |
| 3 | | | |
| ... | | | | counter_min=0
counter_max=2
Line_min=0
Line_max=2

Fig. 9

| port header table | | |
|---|---|---|
| PortID | streamID | targetNodes |
| 1 | 4 | 7 |
| 2 | 3 | 7; 9 |
| ... | ... | ... |

Fig. 10

| line | Slot-Mask | Slot-Value | counter_min=0; counter_max=254 | Line_min=0; Line_max=2 | PortID |
|---|---|---|---|---|---|
| 0 | 1111_1111 | 0 | first slot slow stream | | 0 |
| 1 | 0000_0001 | 1 | every second slot, odd numbered for high rate stream 1 | | 1 |
| 2 | 0000_0001 | 0 | every second slot even numbered for high rate stream 2 | | 2 |

Fig. 11

| line | Slot-Mask | Slot-Value | counter_min=0; counter_max=3 | Line_min=0; Line_max=2 | PortID |
|---|---|---|---|---|---|
| 0 | 0000_0010 | 0 | 50% of slots, always two in a row | | 0 |
| 1 | 0000_0011 | 3 | every fourth slot | | 1 |
| 2 | 0000_0010 | 2 | every fourth slot only, because line 1 takes precedence in half the cases | | 2 |

Fig. 12

| line | Slot-Mask | Slot-Value | counter_min=0; counter_max=252 | Line_min=0; Line_max=12 | PortID |
|---|---|---|---|---|---|
| 0 | 1111_1111 | 0 | first slot for GPIO | | 0 |
| 1 | 0000_0011 | 1 | every fourth slot, for Video1 | | 1 |
| 2 | 0000_0011 | 2 | every fourth slot, for Video2 | | 2 |
| 3 | 0000_0011 | 3 | every fourth slot, for Video3 | | 3 |
| 4 | 0000_1100 | 4 | every sixteenth slot, for Video1 | | 1 |
| 5 | 0000_1100 | 8 | every sixteenth slot, for Video2 | | 2 |
| 6 | 0000_1100 | 12 | every sixteenth slot, for Video3 | | 3 |
| 7 | 0011_0000 | 16 | every sixtyfourth slot, for Video1 | | 1 |
| 8 | 0011_0000 | 32 | every sixtyfourth slot, for Video2 | | 2 |
| 9 | 0011_0000 | 48 | every sixtyfourth slot, for Video3 | | 3 |
| 10 | 1100_0000 | 64 | one additional slot for Video1 | | 1 |
| 11 | 1100_0000 | 128 | one additional slot for Video2 | | 2 |
| 12 | 1100_0000 | 192 | one additional slot for Video3 | | 3 |

Fig. 13

| Receiver Demux Table - Part I | | |
|---|---|---|
| nodeID | streamID | outputPortID |
| 1 | 1 | 1 |
| 1 | 2 | 2 |
| 3 | 1 | 3 |
| 4 | 4 | 4 |
| ... | ... | ... |

Fig. 15

| Receiver Demux Table - Part I |||
|---|---|---|
| nodeID | streamID | outputPortID |
| 1 | 1 | 1 |
| ... | ... | ... |
| Receiver Demux Table - Part II |||
| targetNode | outputPortID ||
| 3 | 2 ||
| ... | ... ||

Fig. 17

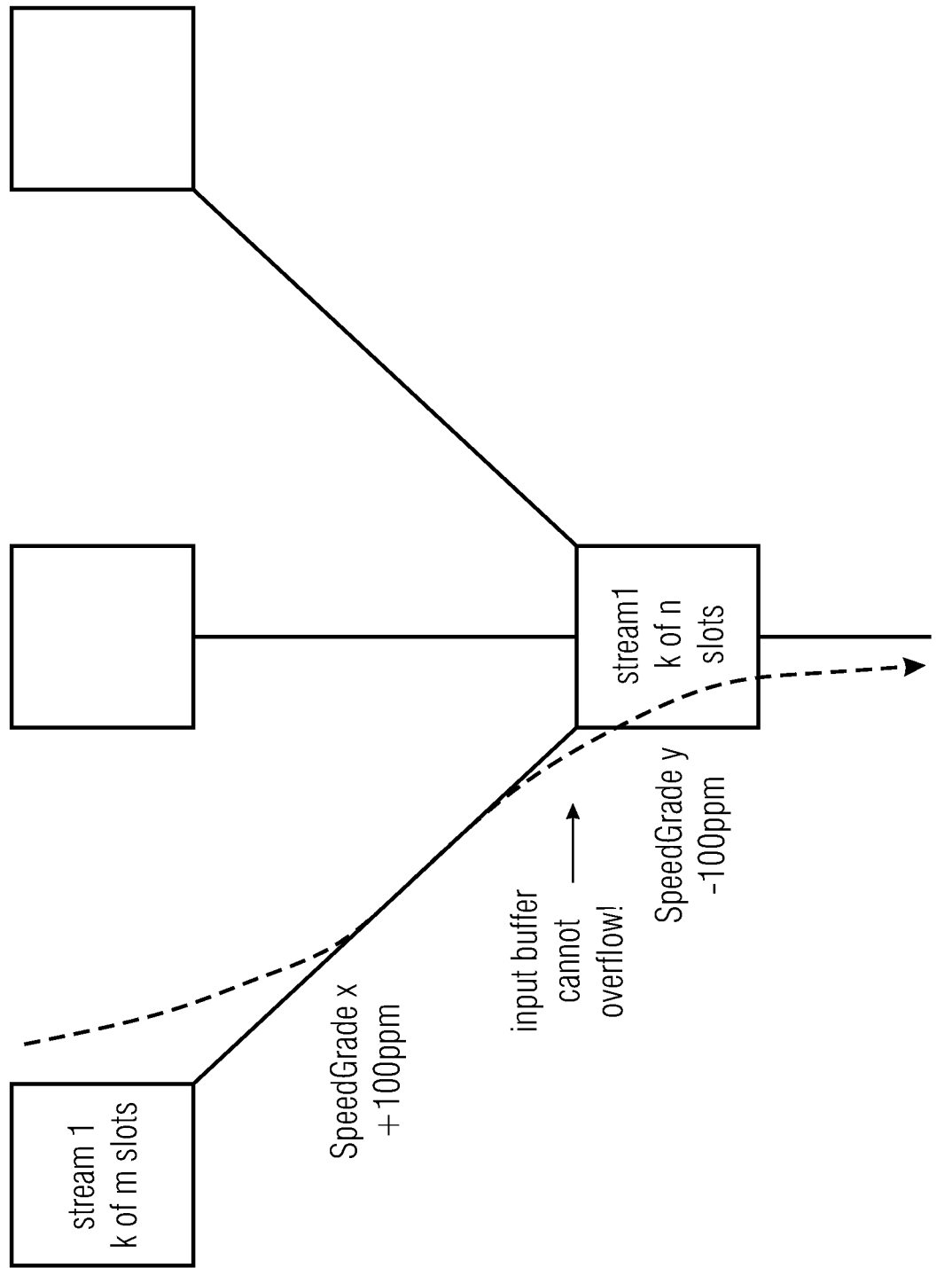

TRANSMITTER AND RECEIVER, SERIALIZER AND DESERIALIZER AND METHODS FOR TRANSMITTING AND RECEIVING, SERIALIZING AND DESERIALIZING

CROSS-REFERENCE TO RELATED APPLICATIONS

This application is a continuation of copending International Application No. PCT/EP2020/056679, filed Mar. 12, 2020, which is incorporated herein by reference in its entirety, and additionally claims priority from European Application No. 19162242.2, filed Mar. 12, 2019, which is also incorporated herein by reference in its entirety.

BACKGROUND OF THE INVENTION

The present invention relates to a transmitter and a receiver, a serializer and a deserializer and to methods for transmitting and receiving, serializing and deserializing.

In a Serializer-Deserializer-System with more than one stream and more than P2P (point-to-point) connectivity, media streams have to be managed across several nodes to achieve a deterministic system throughput for every data stream.

It would be appreciated, if improved concepts for scheduling data transmissions would be provided.

SUMMARY

According to an embodiment, an apparatus for transmitting a plurality of data streams may have: a scheduling unit for selecting a data stream out of the plurality of data streams as a selected data stream, and a transmission unit for transmitting the selected data stream, wherein the scheduling unit is configured to select the selected data stream out of the plurality of data streams depending on scheduling information and depending on a counter value, wherein the scheduling information has a plurality of scheduling elements, wherein each of the plurality of scheduling elements has selection information and data stream information, wherein for each scheduling element of the plurality of scheduling elements, a data stream of the plurality of data streams is assigned to said scheduling element, wherein the data stream information of said scheduling element is data stream information for the data stream being assigned to said scheduling element, wherein for each scheduling element of the plurality of scheduling elements, a selection criterion is either fulfilled or not fulfilled depending on the selection information of said scheduling element and depending on the counter value, wherein, depending on an order of the plurality of scheduling elements of the scheduling information, the scheduling unit is configured to select, as the selected data stream, a data stream out of the plurality of selected data streams, which is assigned to a selection element of the plurality of selection elements, for which the selection criterion is fulfilled, wherein, to select the selected data stream, the scheduling unit is configured to determine for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

Another embodiment may have an apparatus for transmitting scheduling information, wherein the apparatus is configured to transmit the scheduling information having the plurality of scheduling elements, wherein each of the plurality of scheduling elements has scheduling information and data stream information.

According to another embodiment, a system may have: an apparatus for transmitting scheduling information, wherein the apparatus is configured to transmit the scheduling information having the plurality of scheduling elements, wherein each of the plurality of scheduling elements has scheduling information and data stream information, and an inventive apparatus for transmitting a plurality of data streams as mentioned above, wherein the apparatus for transmitting scheduling information is configured to transmit the scheduling information to the apparatus for transmitting a plurality of data streams, wherein the apparatus for transmitting a plurality of data streams is configured to receive the scheduling information from the apparatus for transmitting scheduling information, wherein the scheduling unit of the apparatus for transmitting a plurality of data streams is configured to select a data stream out of the plurality of data streams as a selected data stream using the scheduling information received from the apparatus for transmitting scheduling information, and wherein the transmission unit of the apparatus for transmitting a plurality of data streams is configured to transmit the selected data stream.

Another embodiment may have a system for transmitting a group of data streams, wherein the system has a plurality of communication nodes, wherein each of the plurality of communication nodes is configured to transmit at least one data stream of the group of data streams, and/or is configured to receive one or more data streams of the group of data streams, herein one or more of the plurality of communication nodes have an inventive apparatus for transmitting a plurality of data streams as mentioned above, wherein the group of data streams has the plurality of data streams.

Another embodiment may have a motor vehicle having an inventive system as mentioned above.

According to another embodiment, a method for transmitting a plurality of data streams may have the steps of: selecting a data stream out of the plurality of data streams as a selected data stream, and transmitting the selected data stream, wherein selecting the selected data stream out of the plurality of data streams is conducted depending on scheduling information and depending on a counter value, wherein the scheduling information has a plurality of scheduling elements, wherein each of the plurality of scheduling elements has selection information and data stream information, wherein for each scheduling element of the plurality of scheduling elements, a data stream of the plurality of data streams is assigned to said scheduling element, wherein the data stream information of said scheduling element is data stream information for the data stream being assigned to said scheduling element, wherein for each scheduling element of the plurality of scheduling elements, a selection criterion is either fulfilled or not fulfilled depending on the selection information of said scheduling element and depending on the counter value, wherein the method has selecting, depending on an order of the plurality of scheduling elements of the scheduling information, as the selected data stream, a data stream out of the plurality of selected data streams, which is assigned to a selection element of the plurality of selection elements, for which the selection criterion is fulfilled, wherein, to select the selected data stream, the method has determining for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

Still another embodiment may have a method for transmitting scheduling information, having transmitting the scheduling information having the plurality of scheduling elements, wherein each of the plurality of scheduling elements has scheduling information and data stream information.

Another embodiment may have a non-transitory digital storage medium having stored thereon a computer program for performing the inventive method for transmitting a plurality of data streams as mentioned above or the inventive method for transmitting scheduling information as mentioned above, when said computer program is run by a computer.

An apparatus for transmitting a plurality of data streams is provided. The apparatus comprises a scheduling unit for selecting a data stream out of the plurality of data streams as a selected data stream. Moreover, the apparatus comprises a transmission unit for transmitting the selected data stream. The scheduling unit is configured to select the selected data stream out of the plurality of data streams depending on scheduling information and depending on a counter value, wherein the scheduling information comprises a plurality of scheduling elements, wherein each of the plurality of scheduling elements comprises selection information and data stream information. For each scheduling element of the plurality of scheduling elements, a data stream of the plurality of data streams is assigned to said scheduling element, wherein the data stream information of said scheduling element is data stream information for the data stream being assigned to said scheduling element. Moreover, for each scheduling element of the plurality of scheduling elements, a selection criterion is either fulfilled or not fulfilled depending on the selection information of said scheduling element and depending on the counter value. Depending on an order of the plurality of scheduling elements of the scheduling information, the scheduling unit is configured to select, as the selected data stream, a data stream out of the plurality of selected data streams, which is assigned to a selection element of the plurality of selection elements, for which the selection criterion is fulfilled. To select the selected data stream, the scheduling unit is configured to determine for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

Moreover, an apparatus for transmitting scheduling information is provided. The apparatus is configured to transmit the scheduling information comprising the plurality of scheduling elements. Each of the plurality of scheduling elements comprises scheduling information and data stream information.

Furthermore, a method for transmitting a plurality of data streams, wherein the method comprises:

Selecting a data stream out of the plurality of data streams as a selected data stream. And:

Transmitting the selected data stream.

Selecting the selected data stream out of the plurality of data streams is conducted depending on scheduling information and depending on a counter value, wherein the scheduling information comprises a plurality of scheduling elements, wherein each of the plurality of scheduling elements comprises selection information and data stream information. For each scheduling element of the plurality of scheduling elements, a data stream of the plurality of data streams is assigned to said scheduling element, wherein the data stream information of said scheduling element is data stream information for the data stream being assigned to said scheduling element. Moreover, for each scheduling element of the plurality of scheduling elements, a selection criterion is either fulfilled or not fulfilled depending on the selection information of said scheduling element and depending on the counter value. The method comprises selecting, depending on an order of the plurality of scheduling elements of the scheduling information, as the selected data stream, a data stream out of the plurality of selected data streams, which is assigned to a selection element of the plurality of selection elements, for which the selection criterion is fulfilled. To select the selected data stream, the method comprises determining for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

Moreover, a method for transmitting scheduling information is provided. The method comprises transmitting the scheduling information comprising the plurality of scheduling elements. Each of the plurality of scheduling elements comprises scheduling information and data stream information.

Furthermore, computer programs for implementing one of the above-described methods when being executed on a computer or signal processor are provided.

BRIEF DESCRIPTION OF THE DRAWINGS

In the following, embodiments of the present invention are described in more detail with reference to the figures, in which:

FIG. 5 illustrates a general layer structure of a Serializer/Deserializer node;

FIG. 7 illustrates a frame structure, which is transmitted in defined fragments distributed over several packets of the Data Link and Transport Layer;

FIG. 8 illustrates an example of the Transmitter Scheduling Table;

FIG. 9 illustrates a table comprising a minimum necessary scheduling information;

FIG. 10 illustrates a table comprising information for constructing the header of each packet;

FIG. 11 illustrates a representation of scheduling information according to a first example;

FIG. 12 illustrates a representation of scheduling information according to a second example, with 50% for first stream, 25% for each of second and third stream;

FIG. 13 illustrates a representation of scheduling information according to a third example, with one slot for GPIO, and the remaining slots for three videos;

FIG. 15 illustrates a table for multiplexing different streams onto the physical layer;

FIG. 17 illustrates two parts of a receiver demultiplexing table;

FIG. 19 illustrates an example for an assignment for a connection.

DETAILED DESCRIPTION OF THE INVENTION

Figure 1:
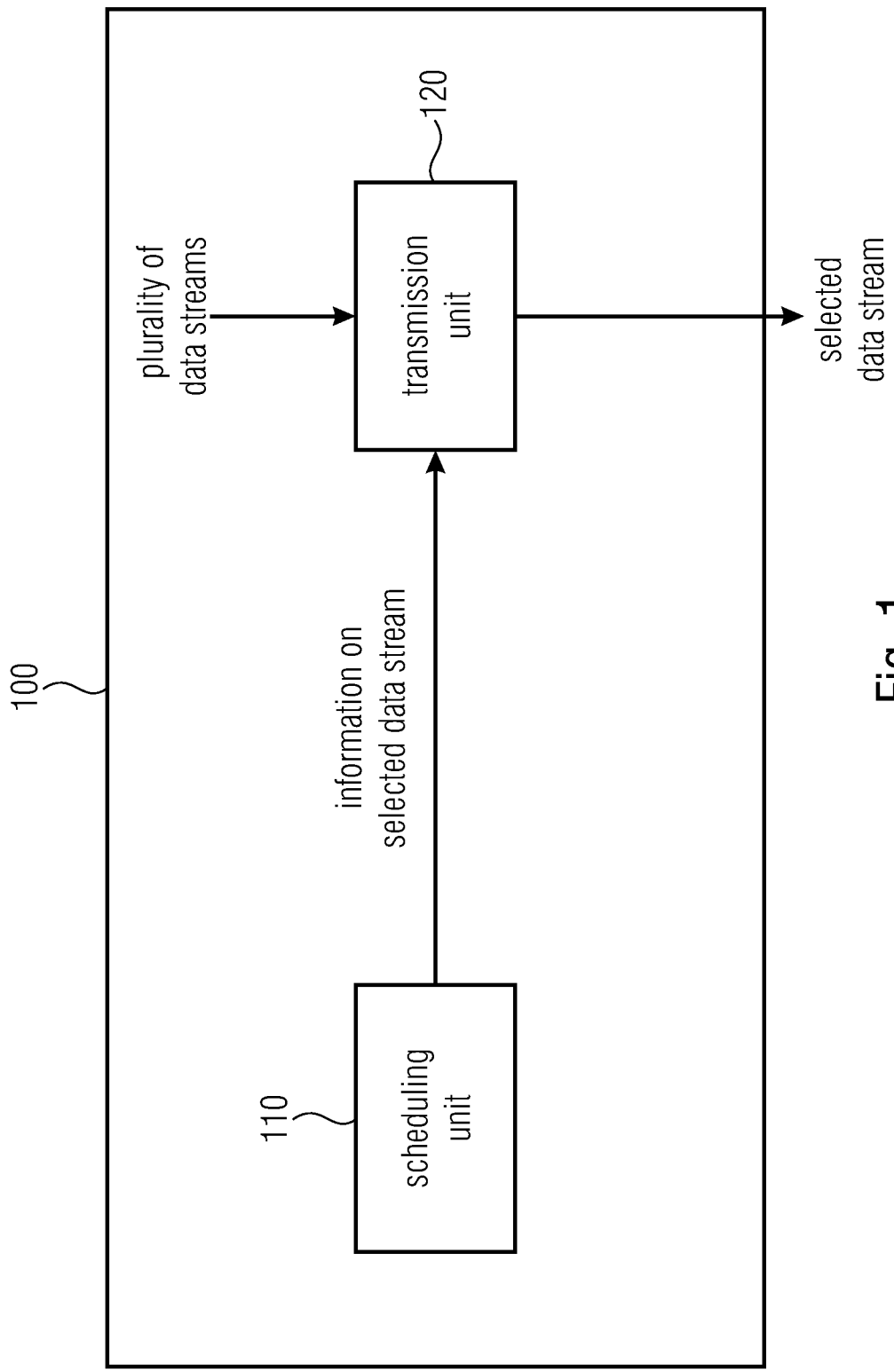
FIG. 1 is an apparatus according to an embodiment.

FIG. 1 illustrates an apparatus 100 for transmitting a plurality of data streams according to an embodiment.

The apparatus 100 comprises a scheduling unit 110 for selecting a data stream out of the plurality of data streams as a selected data stream.

Moreover, the apparatus comprises a transmission unit 120 for transmitting the selected data stream.

The scheduling unit 110 is configured to select the selected data stream out of the plurality of data streams depending on scheduling information and depending on a counter value, wherein the scheduling information comprises a plurality of scheduling elements. Each of the plurality of scheduling elements comprises selection information and data stream information.

For each scheduling element of the plurality of scheduling elements, a data stream of the plurality of data streams is assigned to said scheduling element. The data stream information of said scheduling element is data stream information for the data stream being assigned to said scheduling element.

Moreover, for each scheduling element of the plurality of scheduling elements, a selection criterion is either fulfilled or not fulfilled depending on the selection information of said scheduling element and depending on the counter value.

Depending on an order of the plurality of scheduling elements of the scheduling information, the scheduling unit 110 is configured to select, as the selected data stream, a data stream out of the plurality of selected data streams, which is assigned to a selection element of the plurality of selection elements, for which the selection criterion is fulfilled.

To select the selected data stream, the scheduling unit 110 is configured to determine for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

In an embodiment, the scheduling unit 110 may, e.g., be configured to sequentially process the plurality of scheduling elements of the scheduling information, until a scheduling element is found by the scheduling unit 110, for which the selection criterion is fulfilled.

According to an embodiment, the scheduling unit 110 may, e.g., be configured to determine, in a determination step, for a current scheduling element of the plurality of scheduling elements of the scheduling information, whether the selection criterion is fulfilled or not fulfilled for the current scheduling element. If the selection criterion is fulfilled for the current scheduling element, the scheduling unit 110 may, e.g., be configured to determine, in a selection step, the selected data stream using data stream information of the current scheduling element. If the selection criterion is not fulfilled for the current scheduling element, the scheduling unit 110 may, e.g., be configured to update, in an update step, the current scheduling element, and selects, depending on the order of the plurality of scheduling elements of the scheduling information, another one of the plurality scheduling elements as the current scheduling element.

In an embodiment, the order of the plurality of scheduling elements of the scheduling information is defined such that the plurality of scheduling elements are ordered such that none of the plurality of scheduling elements precedes a first scheduling element of the plurality of scheduling elements, such that none of the plurality of scheduling elements succeeds a last scheduling element of the plurality of scheduling elements, and such that each scheduling element of the plurality of scheduling elements, being different from the first scheduling element and being different from the last scheduling element, has exactly one immediate predecessor among the plurality of scheduling elements that immediately precedes said scheduling element, and has exactly one immediate successor among the plurality of scheduling elements that immediately succeeds said scheduling element. In the update step, if the current scheduling element shall be not used for determining the selected data stream and if the current scheduling element is not the first scheduling element and is not the last scheduling element, the scheduling unit 110 may, e.g., be configured to update the current scheduling element, and selects, depending on a search direction, the immediate predecessor or the immediate successor of the current scheduling element as the current scheduling element. The search direction is either an increasing search direction or a decreasing search direction. The scheduling unit 110 may, e.g., be configured to select the immediate successor, if the search direction is the increasing search direction. The scheduling unit 110 may, e.g., be configured to select the immediate predecessor, if the search direction is the decreasing search direction.

In an embodiment, the scheduling unit 110 may, e.g., be configured to repeat the determination step and the update step, until the scheduling unit 110 determines that the current scheduling element shall be used for determining the selected data stream. Or, the scheduling unit 110 may, e.g., be configured to repeat the determination step and the update step, until the scheduling unit 110 determines that the current scheduling element shall be used for determining the selected data stream or until a criteria to stop searching is fulfilled.

According to an embodiment, the criteria to stop searching may, e.g., be fulfilled, if the search direction is the increasing search direction and if the current scheduling element is the last scheduling element, and if the last scheduling element shall be not used for determining the selected data stream. Or, the criteria to stop searching may, e.g., be fulfilled, if the search direction is the decreasing search direction and if the current scheduling element is the first scheduling element and if the first scheduling element shall be not used for determining the selected data stream.

In an embodiment, the scheduling unit 110 may, e.g., be configured to process at least two of the plurality of scheduling elements of the scheduling information in parallel, to determine for each scheduling element of the at least two scheduling elements whether or not the selection criterion is fulfilled for said scheduling element.

In an embodiment, the scheduling unit 110 is configured to determine for two or more of the scheduling elements of the scheduling information or for all of the scheduling elements of the scheduling information, whether or not the selection criterion is fulfilled, to obtain a group of one or more scheduling elements, for which the selection criterion is fulfilled. The scheduling unit 110 is configured to select, depending on the order of the plurality of scheduling elements of the scheduling information, a scheduling element out of the group of the one or more scheduling elements, for which the selection criterion is fulfilled, as a selected scheduling element. The scheduling unit 110 is to select, as the selected data stream, the data stream which is assigned to said selected scheduling element.

According to an embodiment, if the group of the one or more scheduling elements, for which the selection criterion is fulfilled, comprises more than one of the plurality of scheduling elements of the scheduling information, the scheduling unit 110 is configured to select the selected scheduling element out of the group of the one or more scheduling elements, for which the selection criterion is fulfilled, depending on the order of the plurality of scheduling elements of the scheduling information.

In an embodiment, the order of the plurality of scheduling elements of the scheduling information is defined such that the plurality of scheduling elements are ordered such that none of the plurality of scheduling elements precedes a first scheduling element of the plurality of scheduling elements, such that none of the plurality of scheduling elements succeeds a last scheduling element of the plurality of scheduling elements, and such that each scheduling element of the plurality of scheduling elements, being different from the first scheduling element and being different from the last scheduling element, has exactly one immediate predecessor among the plurality of scheduling elements that immediately precedes said scheduling element, and has exactly one immediate successor among the plurality of scheduling elements that immediately succeeds said scheduling element.

According to an embodiment, if the selection criterion is not fulfilled for any one of the plurality of scheduling elements of the scheduling information, the scheduling unit 110 is configured to select the selected data stream out of the plurality of data streams by conducting a subsequent selection step. The scheduling unit 110 is configured to conduct the subsequent selection step without taking the plurality of scheduling elements of the scheduling information into account.

In an embodiment, the scheduling unit 110 is configured to conduct the subsequent selection step by selecting a port ID from a stack to select the selected data stream.

For example, the stack may comprise requests for best-effort traffic.

According to an embodiment, the scheduling unit 110 is configured to conduct the subsequent selection step using a credit-based scheduler.

In an embodiment, the selected data stream may, e.g., be a first selected data stream. After the scheduling unit 110 has selected the first selected data stream, the scheduling unit 110 may, e.g., be configured to select another data stream of the plurality of data streams as a second selected data stream. After the transmission unit 120 has transmitted a data unit of the first selected data stream, the transmission unit 120 may, e.g., be configured to transmit a data unit of the second selected data stream. After the scheduling unit 110 has selected the first selected data stream, the scheduling unit 110 may, e.g., be configured to modify the counter value. To select the second selected data stream, the scheduling unit 110 may, e.g., be configured to select, as the second selected data stream, a data stream out of the plurality of selected data streams, which is assigned to a selection element of the plurality of selection elements, for which the selection criterion is fulfilled, depending on an order of the plurality of scheduling elements of the scheduling information. To select the second selected data stream, the scheduling unit 110 may, e.g., be configured to determine for at least one scheduling element of the plurality of scheduling elements of the scheduling information or to determine for each scheduling element of the plurality of scheduling elements of the scheduling information, whether or not the selection criterion is fulfilled, depending on the counter value that has been modified by the scheduling unit 110 and depending on the selection information of said scheduling element.

For example, the scheduling unit 110 may, e.g., run on a size of data blocks/data units, wherein the size may, e.g., be configurable, e.g., at initialization, by that may, e.g., be a fixed size at runtime. The size may, e.g., depend on the data rate and/or the time slots of the underlying data transmission medium. A deterministic allocation of an exact portion of the complete available bandwidth becomes is thus possible. A data stream may, e.g., a sequence of these data units. In other words, a data stream may, e.g., comprise a plurality of data units.

According to an embodiment, before or after the scheduling unit 110 has modified the counter value, the scheduling unit 110 may, e.g., be configured to determine a counter comparison result by comparing the counter value with the threshold value. The scheduling unit 110 may, e.g., be to set the counter value to an initial value, if the counter comparison result is equal to a first counter comparison result. The scheduling unit 110 may, e.g., be configured to not set the counter value to the initial value, if the counter comparison result is not equal to the first counter comparison result.

In an embodiment, the apparatus 100 may, e.g., be configured to select and transmit one or more further selected data streams of the plurality of data streams, To select the each further selected data stream of the one or more selected further data streams, the scheduling unit 110 may, e.g., be configured to modify the counter value, and the scheduling unit 110 may, e.g., be configured to select, as said further selected data stream, a data stream out of the plurality of selected data streams, which is assigned to a selection element of the plurality of selection elements, for which the selection criterion is fulfilled, depending on an order of the plurality of scheduling elements of the scheduling information, To select said further selected data stream, the scheduling unit 110 may, e.g., be configured to determine for at least one scheduling element of the plurality of scheduling elements of the scheduling information or to determine for each scheduling element of the plurality of scheduling elements of the scheduling information, whether or not the selection criterion is fulfilled, depending on the counter value that has been modified by the scheduling unit 110 and depending on the selection information of said scheduling element. The transmission unit 120 is configured to transmit each data stream of the one or more further data streams that has been selected by the scheduling unit 110.

According to an embodiment, the transmission unit 120 may, e.g., be configured to transmit the one or more further selected data streams in a same order as the one or more further selected data streams have been selected by the scheduling unit 110.

In an embodiment, the selection information may, e.g., comprise a slot mask and a slot value. The scheduling unit 110 may, e.g., be configured to combine the counter value und the slot mask according to a combination rule to obtain a combined value. E.g., the current scheduling element shall be used for determining the selected data stream, if the combined value is equal to the slot value. E.g., the current scheduling element shall not be used for determining the selected data stream, if the combined value is not equal to the slot value.

According to an embodiment, the scheduling unit 110 may, e.g., be configured to combine the counter value und the slot mask according to the combination rule, e.g., comprise to conduct a bitwise operation.

In an embodiment, the bitwise operation may, e.g., be an AND operation, or an OR operation, or a NAND operation, or a NOR operation, or an XOR operation or an XNOR operation.

According to an embodiment, the combination rule may, e.g., comprise to conduct a shift operation after the bitwise operation. For example, an example of a combination rule may, e.g., be: AND-combine the counter and the binary value 0011, and then shift the result 2 bits right.

According to an embodiment, each of the plurality of scheduling elements of the scheduling information may, e.g., be assigned to exactly one of the plurality of data streams.

In an embodiment, for a data stream of the plurality of data streams, two or more of the plurality of scheduling elements of the scheduling information may, e.g., be assigned to said data stream.

According to an embodiment, the data stream information of the current scheduling element may, e.g., comprise at least one of at least one of
  a port identifier identifying a port,
  a stream identifier identifying the data stream, being assigned to the current scheduling element,
  a target node identifier identifying a target node to which the data stream, being assigned to the current scheduling element, shall be transmitted,
  a data unit number identifying a data unit of the data stream, being assigned to the current scheduling element.

E.g., the port identifier comprises information to select the next data unit that shall be transmitted. E.g., a stream identifier and a target node may, e.g., be appended to the port identifier. The complete information may, e.g., be organized in a header. The header may, e.g., also comprise a data unit number and may, e.g., be CRC-protected. Further functions may, e.g., be conducted, e.g., demultiplexing (deliver the data unit to the correct output port at the receiver) and/or switching and/or routing to a correct port in a forwarding node.

In an embodiment, the apparatus may, e.g., be configured to receive the scheduling information comprising the plurality of scheduling elements. Each of the plurality of scheduling elements may, e.g., comprise scheduling information and data stream information.

According to an embodiment, the scheduling information may, e.g., comprise indexing information of a range of the plurality of scheduling elements.

According to an embodiment, the scheduling information may, e.g., further comprise a cyclic redundancy check code which provides check information for the plurality of scheduling elements. The apparatus may, e.g., be configured to check whether or not the plurality of scheduling elements are correctly received using the cyclic redundancy check code.

In an embodiment, the scheduling information of each scheduling element of the plurality of scheduling elements may, e.g., comprise a slot mask and a slot value for said scheduling element. The data stream information of each scheduling element of the plurality of scheduling elements may, e.g., comprise at least one of a port identifier identifying a port, and a stream identifier identifying one of the plurality of data streams, and a target node identifier identifying a target node.

Figure 2:
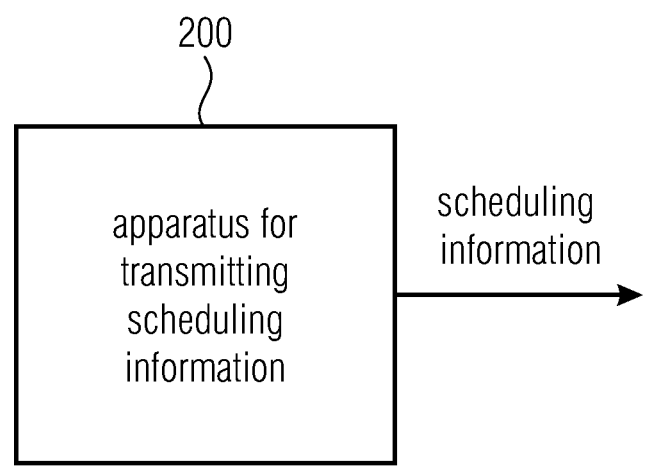
FIG. 2 illustrates an apparatus 200 for transmitting scheduling information according to an embodiment.

FIG. 2 illustrates an apparatus 200 for transmitting scheduling information according to an embodiment. The apparatus 200 is configured to transmit the scheduling information comprising the plurality of scheduling elements. Each of the plurality of scheduling elements comprises scheduling information and data stream information.

According to an embodiment, the scheduling information may, e.g., further comprise a cyclic redundancy check code which provides check information for the plurality of scheduling elements.

In an embodiment, the scheduling information of each scheduling element of the plurality of scheduling elements may, e.g., comprise a slot mask and a slot value for said scheduling element. The data stream information of each scheduling element of the plurality of scheduling elements may, e.g., comprise at least one of a port identifier identifying a port, and a stream identifier identifying one of the plurality of data streams, and a target node identifier identifying a target node.

Figure 3:
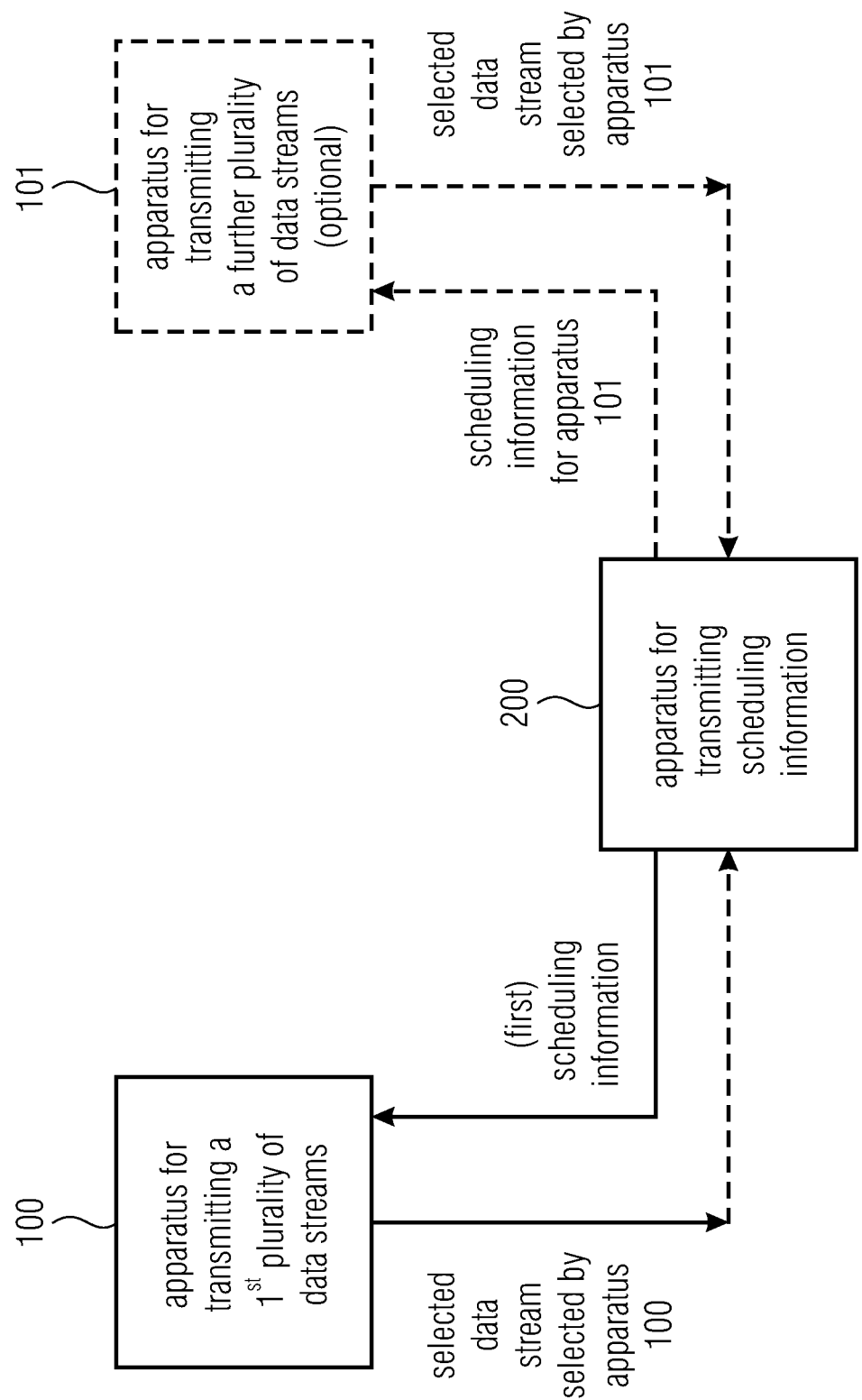
FIG. 3 illustrates a system according to an embodiment.

FIG. 3 illustrates a system according to an embodiment. The system comprises an apparatus 200 as described with respect to FIG. 2 for transmitting scheduling information.

Moreover, the system comprises an apparatus 100 as described with respect to FIG. 1 for transmitting a plurality of data streams.

The apparatus 200 of FIG. 2 is configured to transmit the scheduling information to the apparatus of FIG. 1.

The apparatus 100 of FIG. 1 is configured to receive the scheduling information from the apparatus of FIG. 2.

The scheduling unit 110 of the apparatus 100 of FIG. 1 is configured to select a data stream out of the plurality of data streams as a selected data stream using the scheduling information received from the apparatus 200 of FIG. 2.

The transmission unit 120 of the apparatus 100 of FIG. 1 is configured to transmit the selected data stream.

According to an embodiment of the system of FIG. 3, the transmission unit 120 of the apparatus 100 of FIG. 1 may, e.g., be configured to transmit the selected data stream to the apparatus 200 of FIG. 2.

In an embodiment of the system of FIG. 3, the apparatus 100 of FIG. 1 may, e.g., be a first apparatus according to FIG. 1, wherein the scheduling information may, e.g., be first scheduling information. The system may, e.g., further comprise one or more further apparatuses 101 according to FIG. 1 for transmitting one or more further pluralities of data streams. For each apparatus 101 of the one or more further apparatuses 101 according to FIG. 1,
  the apparatus 200 according to FIG. 2 may, e.g., be configured to transmit scheduling information for said apparatus 101 according to FIG. 1 to said apparatus 101 according to FIG. 1,
  said apparatus 101 according to FIG. 1 may, e.g., be configured to receive said scheduling information from the apparatus 200 of FIG. 2,
  the scheduling unit 110 of said apparatus 101 according to FIG. 1 may, e.g., be configured to select a data stream out of one of the one or more further pluralities of data streams as a selected data stream using said scheduling information received from the apparatus 200 of FIG. 2, and the transmission unit 120 of said apparatus 101 according to FIG. 1 may, e.g., be configured to transmit said selected data stream.

According to an embodiment of the system of FIG. 3, for each apparatus 101 of the one or more further apparatuses 101 according to FIG. 1, the transmission unit 120 of said apparatus 101 may, e.g., be configured to transmit the selected data stream, selected by said apparatus 101, to the apparatus of FIG. 2.

Moreover, a motor vehicle comprising the system according to one of the above-described embodiments is provided.

According to an embodiment, the motor vehicle may, e.g., be a car or a motor truck.

In an embodiment, the system is based on assigning the traffic of different streams to fixed length time slots and scheduling these slots with a weighted round robin method to ensure absolute deterministic allocation of the available bandwidth to different data streams.

The scheduling table is encoded in an efficient way, so that several streams with largely different throughputs can be configured in a low number of table entries. This would also allow fast reconfiguration in case of changes in port weights (bandwidth allocation) or activity/inactivity in case of low-power states of sources.

Streams carry unique identifiers through the network branch, which are preserved in daisy-chaining nodes. Packet integrity can be checked per link segment through CRC and packet counter evaluation of each header.

Figure 4:
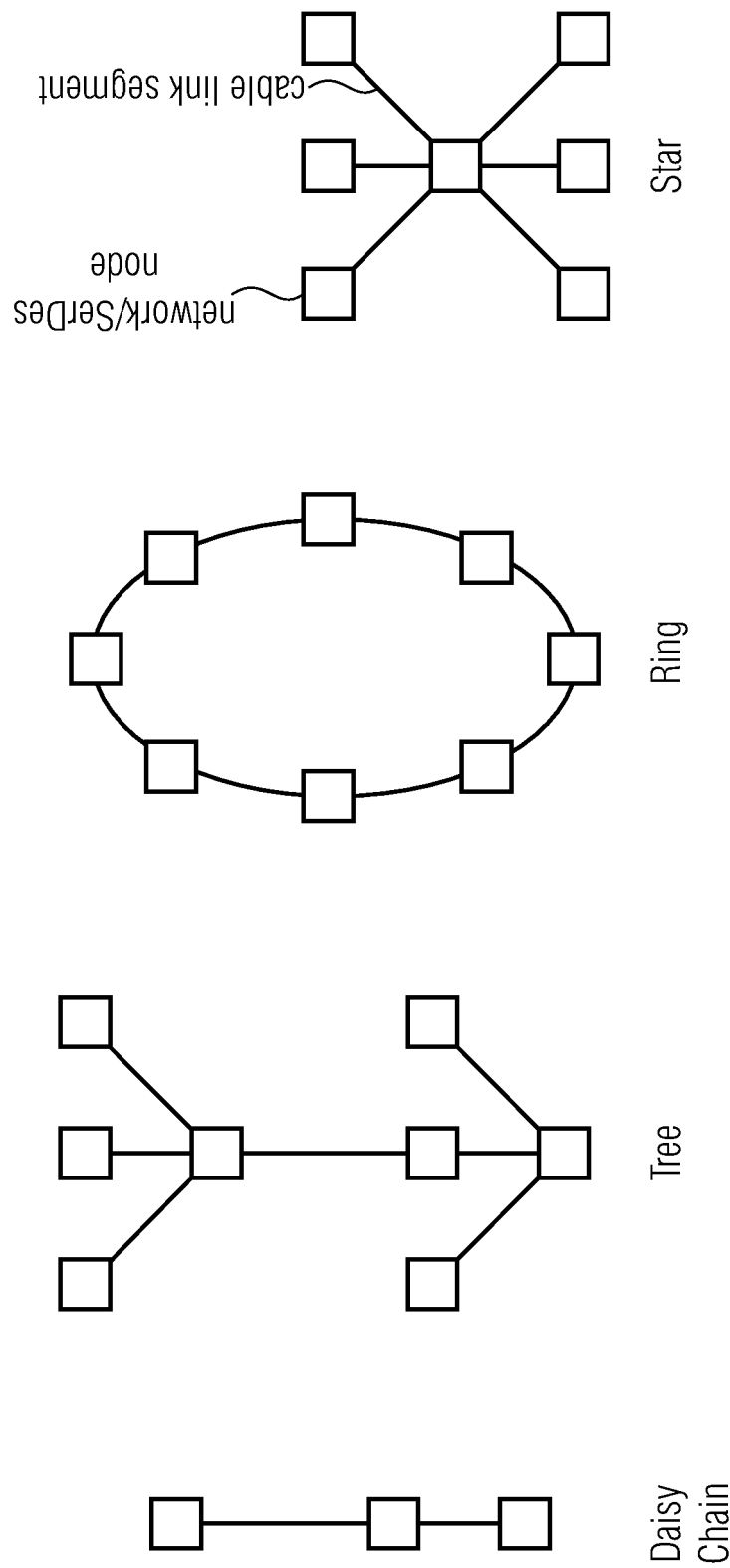
FIG. 4 illustrates four network topologies.

FIG. 4 shows possible network topologies, which can be supported by the claimed routing or stream management mechanism. The Daisy Chain is just a linear topology of an arbitrary number n of nodes.

The Tree is an extension of the daisy chain, where each node can connect to an arbitrary number (higher than two) of link segments (through one physical layer instance each).

The Ring is a linear topology, which loops back on the first node in the linear topology. The stream management mechanism is not relying on a ring topology, but it can be configured to handle any loop (meaning, there is at least one alternative path of link segments from a node A to another node B).

The Star is a special form of the tree, where each node, except the center node, only has a connection to a single link segment.

Each node in the topology can source, sink and forward a multitude of streams. The number of streams, which can be handled, is determined by the size of the Transmitter Scheduling Table.

FIG. 5 shows the general layer structure of a SerDes node. There is a physical layer having a single interface/port, dubbed the physical layer port (PLP), for payload data from and to a higher layer. This higher layer, the data link and transport layer is responsible for managing the flow control of data streams of a multitude of input ports (from again higher layers, the applications), dubbed Data Link and Transport Layer Port (DTLP) onto the physical layer at the transmitter side; as well as managing the distribution of the aggregated data stream from the physical layer onto a multitude of output ports to higher layers at the receiver side. The transmitter side uses the Transmitter Scheduling Table for this purpose, the receiver side uses the Receiver Stream Assignment Table.

Every node is assumed to have at least a physical layer transmitter, a physical layer receiver, a data link and transport layer receive function and a data link and transport layer transmit function.

The physical layer is assumed to be full-duplex. Any sort of echo cancellation or other technique to ensure proper (meeting target data rate and bit error rate) data reception, while transmitting at the same time, is handled by the physical layer. The data link and transport layer does not handle collisions.

The physical layer therefore can also be half-duplex or dual-simplex; these properties are usually encapsulated in the physical layer and not exposed to the higher layer and hence do not interfere with the scheduler operation.

Figure 6:
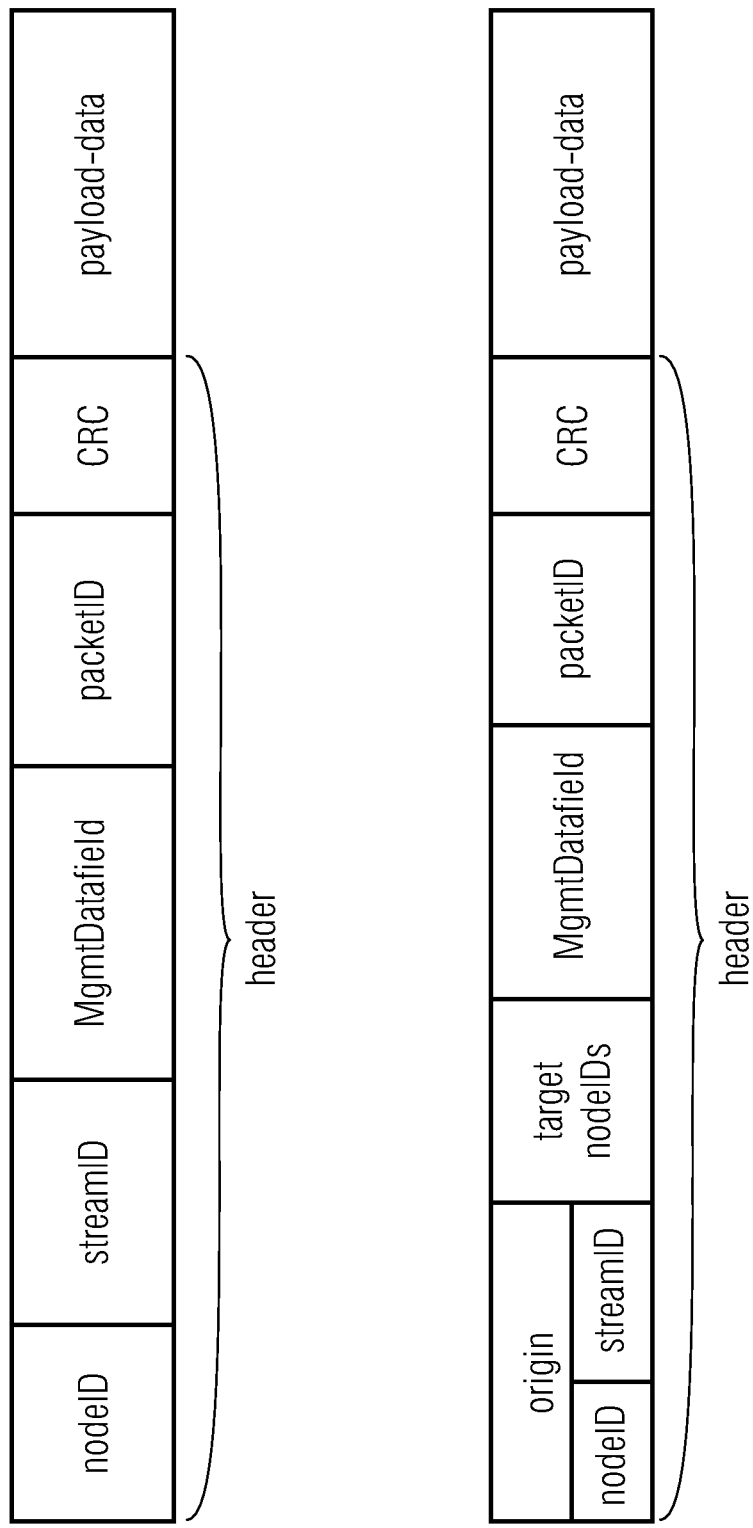
FIG. 6 illustrates a packet/frame format at the Packet Layer Protocol.

FIG. 6 shows the packet/frame format at the PLP. It consists of a header and a payload data field. The header should comprise, at a minimum, the streamID information, which is read at the receiver side to assign the received packet/frame to the correct output DTLP. The additional information nodeID can help to keep the stream identification unique, if every nodeID is only used once in the network; it is an extended stream identifier.

The targetID or targetIDs can be used to identify the nodeID, at which the packet "leaves the network" (e.g., an address). This information can be used to double- or error-check the receiver demultiplexing at the target node and to facilitate forwarding of the packet at intermediate nodes. The field can be a single targetID, a list of targetIDs or it can be coded (to occupy less bits) as the first targetID and a number of (shorter) offset values for additional targetIDs.

The packetID comprises a counter value, which is incremented by the transmitting data link and transport layer for every new packet/frame, which is passed to the PLP. The packetID can be a global counter over all stream of one node.

Alternatively, every stream has its own packetID counter. The counter is of finite length and just runs over to 0 (or a defied minimum value) once it has reached its maximum value and is incremented again. The packetID counter can be used as an error checking mechanism: every final stream sink is expecting packetIDs in ascending order (running over from maximum value to 0 (or a defied minimum value) is also considered ascending) and it is expecting packetIDs without omission. Any other received sequence of packetIDs indicates some sort of error between stream source DTLP and sink DTLP.

MgmtDatafield (or Management Data Field) is used for internal communication between the two data link and transport layers connected (via the respective physical layer instances) to one link segment. The communication can use a fixed predefined set of fields or it can use a frame structure with requests for information from certain register-addresses as well. The predefined set of fields or frame structure can be integrated into a single DTLP packet/frame payload or it can be fragmented and transmitted over several DTLP packets/frames.

All of these fields are advantageously of fixed length to simplify the decoding of the header in the receiver. However, variable length fields are possible and might be useful, especially for the MgmtDatafield. The order of the fields does not play any role; it just needs to be defined between transmitting DTLP and receiving DTLP.

The CRC (cyclic redundancy check) can be run over all or a selection of the field. It provides a mechanism to check the header information against data corruption. It can be evaluated by the receiving data link and transport layer. It can also still exist, even if the physical layer employs an error correcting mechanism, which would also serve to flag any data corruption of the packet/frame.

The CRC is just one example of data integrity check, any other known technique can be employed to perform the same function.

To facilitate a scalable internal communication through the MgmtDatafield, a frame structure can be used, which is transmitted in defined fragments distributed over several packets of the Data Link and Transport Layer.

FIG. 7 shows one example of the frame structure. There is a header and a payload field. StartFrame and EndFrame markers are used for flexible frame sizes and can be omitted, if the MgmtData-Frame is of fixed size. The order of StartFrame and Header can also be reversed. Payload is coded, when a flexible frame size is used to allow for StartFrame and EndFrame markers. Fixed frame size can use both coded and uncoded payload. The payload either transmits information in predefined cycles or uses a command, address and data scheme, where certain actions (like read/write register are requested and responses are returned.)

FIG. 8 shows an example of the Transmitter Scheduling Table. The table has n numbers of entries, advantageously a power of 2, for example 256. The scheduler runs a counter, which starts at some initial value (for instance 0) and is incremented for every packet, that is put into the physical layer. The table also comprises a setting 'counter_max', which defines, at what value the counter runs over and is reset to 'counter_min'. If counter_max is omitted, the counter runs over at the maximum value defined by its bit width, which should be equal or smaller to the number of lines in the table. If counter_min is not used, the counter resets to all zero.

Line_min and Line_max define the range of the table, which is evaluated after every counter increment. Setting Line_min and Line_max to only a section of filled out lines in the table essentially enables a "sub-table". This can be used to have two or more different schedules in the table, which can be switched by simply changing Line_min and Line_max.

For each new value of the counter, the table is evaluated as follows:
Starting with Line 'Line_min', the counter value is logical-and concatenated with the Slot-Mask field of that line and compared to the Slot-Value field of that line
If the comparison is negative, the same evaluation is done with the next line
If the comparison is positive, a packet from the port value in that line is put to the physical layer, the counter is incremented and the evaluation starts over In other words, the lines of the scheduling table do not have to evaluate positive for only a single counter value, but instead they have a precedence: the lowest line number between Line_min and Line_max, which evaluates positive, wins.

The evaluation of the lines can be executed in parallel to speed up the evaluation and the precedence rule can be applied to the lines, which evaluate positive.

The streamID can be assigned the same as the Port number; alternatively, the scheduling table may comprise separate columns for Port number and streamID for an independent assignment of streamIDs.

A certain streamID (for example 0x00) can stay reserved for internal management/administration data between nodes (on top of or alternatively to the MgmtField in the header). Several reserved streamIDs for network internal functionalities like node management and debugging or security are possible.

Locally generated streams can get a target nodeID assigned, which makes forwarding possible with a smaller decoder table. An empty or all zero 'target nodeID' field can designate receiving from a forwarded port. In this case, the DTL does not generate a header for the packet, but reads it from the port.

To save memory, the minimum necessary scheduling information can be kept in one table, illustrated by FIG. 9.

And the information for the construction of the header of each packet can be kept in another table, illustrated by FIG. 10.

In this way, duplicates are avoided.

The combination of counter mask information and the precedence rule is an efficient and easy to evaluate representation of the scheduling information. Complex schedules can be encoded in a few lines. At the same time, if Slot-Mask is set to all ones, the table can be used in a conventional way, where each of the lines comprises and only evaluates positive at a single counter value. A mixture of both notations is also possible.

Here are some examples:

FIG. 11 illustrates a first example: one slot for GPIO, rest evenly between two Video streams.

FIG. 12 illustrates a second example: 50% for first stream, 25% for each of second and third stream.

FIG. 13 illustrates a third example: one slot for GPIO, rest 33% for three videos.

From these examples, it can be seen, that relatively long schedules with fine-grained assignment/allocation of bandwidth can be realized by a description with very few lines in the table.

The scheduler has to provide at least the bandwidth needed by the port (or protocol on top), but it can also provide more. This mismatch might not be avoidable, because the granularity of the scheduler is not infinitesimal precise. This means, from time to time, there will be no or not enough data from the port and the slot would get wasted. In this situation, there could be something like a best effort port (or stack of PortIDs), which is not comprised in the normal schedule and only gets to transmit data, when a regular port in the schedule forfeits a time slot. There is no bandwidth allocation guarantee for this best effort port.

Figure 14:
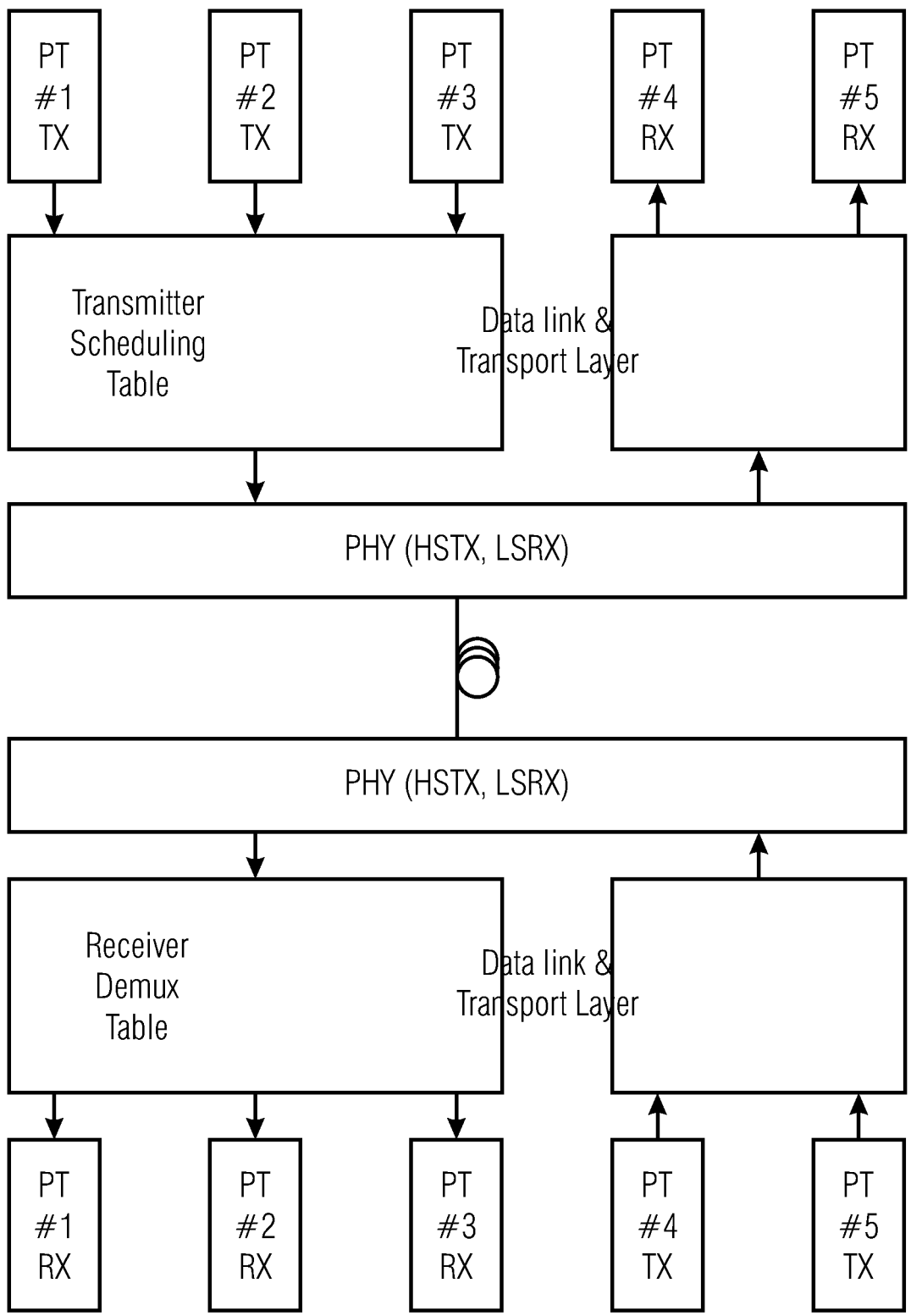
FIG. 14 illustrates a point-to-point link with two data link layers.

FIG. 14 shows the depiction of a point-to-point link with two data link layers. The different stream, which have been multiplexed onto the physical layer, have to be demultiplexed at the receiver side to output ports of the data link & transport layer. This is again done with a table, as illustrated by FIG. 15.

The combination of nodeID.streamID is a unique identification of logical streams in the network and is used for look-up. The receiving DTL has to decode the packet header, check the CRC and use the fields nodeID and portID for a table lookup. The portID found will get the packet. This is done for every received packet. The DTLP can detect and record errors like a wrong CRC or a nodeID.streamID pair not found in the Receiver Demux Table. Erroneous packets like this should be discarded.

The table needs only to be as long as there are possible local ports.

Figure 16:
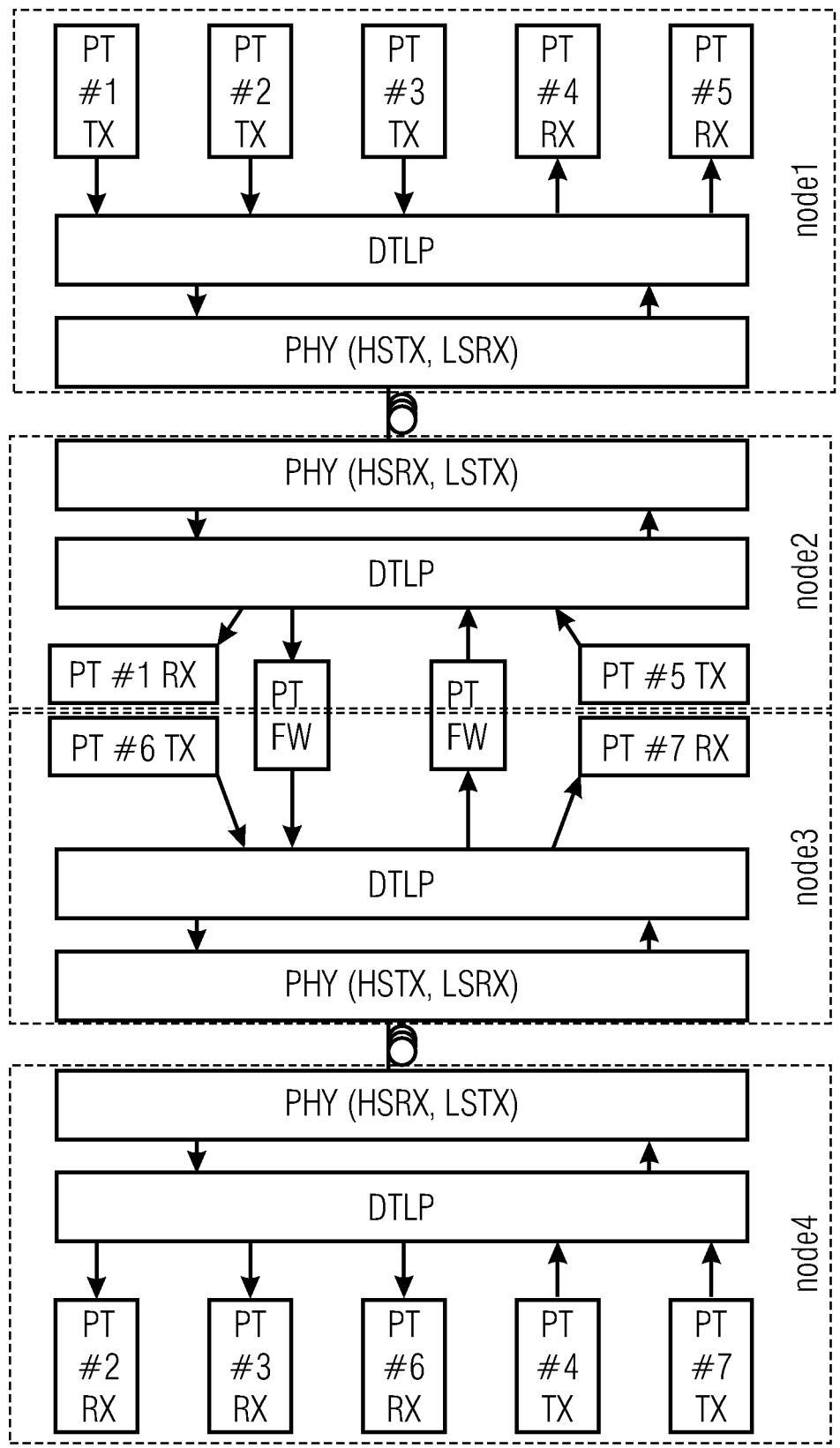
FIG. 16 illustrates a daisy chaining example.

The multiplexing technique also supports more than point-to-point connections. This means, there are data streams, which are being forwarded in one network device/chip (node2 and node3 in the daisy chaining example illustrated by FIG. 16).

A communication node may, e.g., be a physical or logical device configured for transmitting and/or receiving a data stream.

In order to support this, the Receiver Demux Table has a second part, illustrated by FIG. 17, which comprises per targetNodeID the outputPortID, that the respective packages needs to go to. Several targetIDs can map to the same port, because those parts are further hops away but all connected to that link behind the port. (In FIG. 17, node 4 could have further nodes 5, 6 and 7 connected, and all these targetIDs would be forwarded through the same port in node2). See also more abstracted illustration in FIG. 18.

Star- and Tree-topologies have multiple forwarding connections between at least three DTLs in at least one node of the network. A receiving DTL can connect to any number of DTL through its outputPorts, but it uses only one Port per DTL because the routing is handled by targetID and any number of logical streams can share that port.

Organizing the Part II of the Receiver Demux Table by targetID instead of nodeID.streamID is done to save space/memory. The network always has fewer or equal numbers of nodes (and therefore possible targetIDs) than it has possible logical streams, since every node has at least on logical stream originating from it (slow control or fast data). One can construct a hypothetical network, where only one node produces data, several nodes consume it and there are no control streams (back channels). Here, there are more nodes than logical streams, but this example is not relevant in practice.

Figure 18:
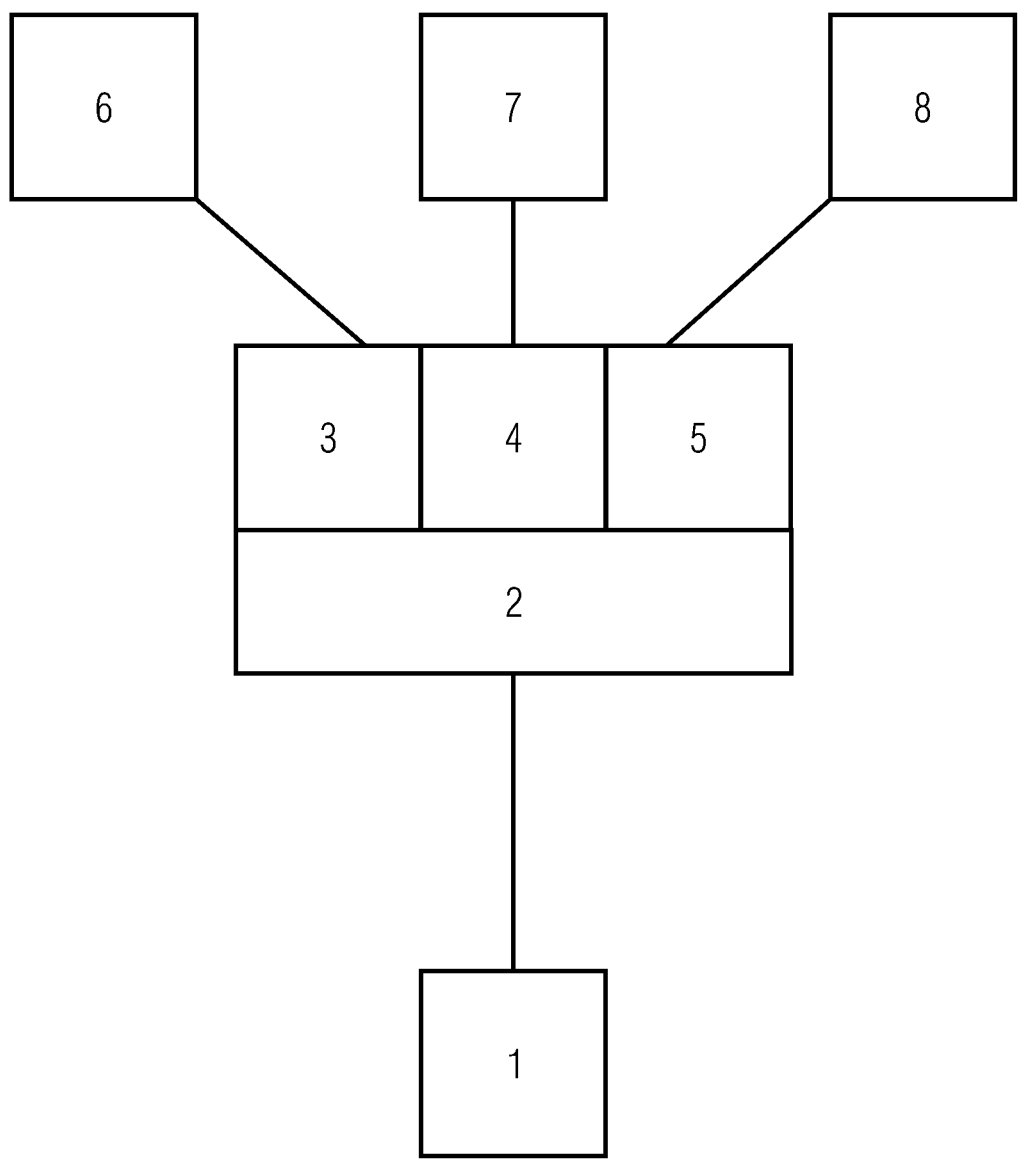
FIG. 18 illustrates a plurality of connected nodes and their connections.

The targetID or targetIDs are carried in the header of the packet (see above) and the information is available at the same time and extracted the same way as the demultiplexing for local (non-forwarding) output ports. Multiple targetIDs are used to enable stream duplication. In FIG. 18, if a stream, originating at node1, would carry targetIDs 7 and 8, the receiving DTL in node2 would send it through port to node4 and 5 and thus executing the stream duplication.

In such a forwarding scenario, transmitter scheduling has to be handled for every intermediate transmitting DTL as well. The streams traversing the network further than point-to-point (for instance streams or protocol translates #2, #3, and #4 in the daisy chaining topology of FIG. 18) have to rely on the guaranteed bandwidth allocation over all hops (or link segments).

In the basic case, there is a clock master in the network and all other synchronize their local oscillators to that clock master, so that on average, the data rates of the links are in a fixed ratio. There might be different speeds of the physical layers, so that the first link (from node1 to node2 in the daisy chaining example) runs at 2 Gbps while the second link (from node3 to node4) runs at 4 Gbps. If the number of slots in one round of the scheduler are chosen, such that the bandwidth per slot on first and second link is equal, the same number of slots allocated to that stream on both schedulers guarantees the bandwidth over the daisy chain. The PT FW (protocol forward) needs to implement a buffer (FIFO) to compensate for short term differences between the local oscillators.

Instead of oscillator-based synchronization, a time-stamp based synchronization based on logical clocks can be used to facilitate network forwarding without any buffer overflow. For instance, time stamps based on a mechanism like or comparable to the Precision Time Protocol can be used.

In the case, that the bandwidth per slot is not equal or in some manageable fractional rational ratio, the bandwidth reservation on the second link has to be larger than the bandwidth reservation on the first link. In this case, the buffer in the PT FW will from time-to-time underflow and the scheduler in node3 has nothing to send. The same applies here for an empty slot and the possibility for best effort traffic as described above.

In the more complicated case, that the clocks of the nodes are not synchronized, but only precise within a certain clock offset specification "clk_prcsn ppm", the reservation of an identical number of slots for a nominally equal bandwidth per slot does not work. Instead, the number of total scheduler slots1 to use can be calculated by $$Slots1 > Slots2*(1e6+clk\_prcsn1)/(data\_rate1/data\_rate2*1e6-clk\_prcsn2)$$

for a link1 with nominal data_rate1 and clk_prcsn1 transmitting into a link2 with data_rate2 and clk_prcsn2 and scheduling with total number "slots2".

Under this condition of total scheduler slots, assigning the stream the same number of slots in one round of the scheduler guarantees the bandwidth through the daisy-chain (over the hop).

Any other reservation, where link2 bandwidth (at slow clock) is equal or larger than link1 bandwidth (at fast clock) also works. Above described way realizes this condition for same number of stream-assigned slots.

FIG. 19 depicts the assignment for one stream. The transmit scheduler in the forwarding network node (node3 in daisy-chaining example) has to assign of course enough slots for all logical streams, which are being forward through that port. Above calculation can be executed for each pair of links (slots1 is the first link, "m slots" above) and then, the necessary allocation is the sum of all slots for all forwarded streams from first links.

Using the forwarded stream functionality and the fact, that each header comprises a fraction (MgmtInfoField) of an internal control/configuration/monitoring communication, a (Master) node receiving streams from several different nodes (and also sending streams back to those nodes; for instance control data) can run several independent internal control communication sessions and can thus manage nodes over the network. For instance, in the daisy chaining example above, the streams of protocols #6 and #7 are used for a session between node4 and node3; while the streams of protocols #2, #3 and #4 are used to run a session between node4 and node1.

In the case of streams, which are duplicated, only one (for example the first) of the targetIDs can be used to transport fragments of a control session (actually receive fragments of the control session). Otherwise the recipient is unclear and a lot of faulty frames are generated.

Should the situation occur, that there is no bidirectional communication possible, the scheduler can be appended with a streamID=0 and the necessary target node to carry the control session frames as payload.

Thus, in an embodiment, a system for transmitting a group of data streams is provided. The system comprises a plurality of communication nodes.

Each of the plurality of communication nodes is configured to transmit at least one data stream of the group of data streams, and/or is configured to receive one or more data streams of the group of data streams.

One or more of the plurality of communication nodes comprise an apparatus 100 of FIG. 1 for transmitting a plurality of data streams, wherein the group of data streams comprises the plurality of data streams.

According to an embodiment, at least one node of the one or more of the plurality of communication nodes, which comprise an apparatus 100 of FIG. 1, may, e.g., be a forwarding node, which may, e.g. be configured, for each data stream of the plurality of data streams, to receive said data stream from a first node of the plurality of communication nodes, and to transmit said data stream to a second node of the plurality of communication nodes, wherein said data stream may, e.g., comprise header information, wherein said header information may, e.g., comprise a stream identifier of the data stream. Said at least one node may, e.g., comprise a demultiplexing table which may, e.g., comprise a plurality of table entries for mapping a stream identifier to an output port. Moreover, said at least one node may, e.g., be configured to determine the second node of the plurality of communication nodes to which said data stream shall be transmitted using the header information of said data stream and the demultiplexing table.

In an embodiment, said at least one node may, e.g., be configured to receive two or more of the plurality of data streams from an intermediate node of the plurality of communication nodes, wherein said intermediate node does not comprise an apparatus 100 of FIG. 1.

According to an embodiment, said at least one node may, e.g., be configured to duplicate a data stream of the plurality of data streams to obtain two resulting data streams. Using the apparatus 100 of FIG. 1, said at least one node may, e.g., be configured to transmit the two resulting data streams to two different nodes of the plurality of communication nodes.

A specific feature of embodiments of the invention are the efficient realizable and flexibly adjustable transmitter scheduler or serializer scheduler or the efficient realizable flexibly adjustable receiver descheduler or de-serializer.

In embodiments, configuration possibilities of the transmitter scheduler or serializer scheduler can be written via registers.

Embodiments can be used in many different scenarios where different data streams have to be transmitted such as in automotive applications where, e.g. for autonomous driving, data streams coming from different sensors such as radar sensors, optical sensors, . . . are to be serialized, transmitted, de-serialized and processed.

The inventive transmitted or received signal can be stored on a digital storage medium or a non-transitory storage medium or can be transmitted on a transmission medium such as a wireless transmission medium or a wired transmission medium such as the Internet.

In an embodiment, a transmitter or Serializer as described before or using a transmitter scheduling table is provided.

Moreover, in another embodiment, a receiver or deserializer as described before or using a receiver stream assignment table us provided.

Furthermore, according to an embodiment, a method of transmitting or serializing as described before or using a transmitter scheduling table is provided.

Moreover, in another embodiment, a method of receiving or de-serializing as described before or using a receiver stream assignment table is provided.

Furthermore, a computer program for performing, when running on a computer or a processor, one of the above-described methods is provided.

Moreover, a transmitted or received signal as described before is provided.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for transmitting a plurality of data streams, wherein the apparatus comprises:
   a scheduling unit for selecting a data stream out of the plurality of data streams as a selected data stream, and
   a transmission unit for transmitting the selected data stream,
   wherein scheduling information comprises a plurality of scheduling elements, wherein each of the plurality of scheduling elements comprises selection information and data stream information indicating a data stream being assigned to said scheduling element,
   wherein the scheduling unit is configured to select a scheduling element out of the plurality of scheduling elements as a selected scheduling element by analysing the selection information of at least one of the plurality scheduling elements depending on a counter value of a counter, and is configured to select the selected data stream out of the plurality of data streams, so that the selected data stream is the data stream being indicted by the selected scheduling element,
   wherein the scheduling unit is configured to determine for at least one scheduling element of the plurality of scheduling elements whether, when analysing the selection information of said at least scheduling element together with the counter value, a selection criterion is fulfilled or not,
   wherein the plurality of scheduling elements are arranged in an order,
   wherein the scheduling unit is configured to select the selected scheduling element by selecting a scheduling element out of the plurality of scheduling elements of the scheduling information for which the selection criterion is fulfilled depending on the order of the plurality of scheduling elements.

2. The apparatus according to claim 1,
   wherein the scheduling unit is configured to sequentially process the plurality of scheduling elements of the scheduling information, until a scheduling element is found by the scheduling unit 110, for which the selection criterion is fulfilled.

3. The apparatus according to claim 1,
   wherein the scheduling unit is configured to determine, in a determination step, for a current scheduling element of the plurality of scheduling elements of the scheduling information, whether the selection criterion is fulfilled or not fulfilled for the current scheduling element,
   wherein if the selection criterion is fulfilled for the current scheduling element, the scheduling unit is configured to determine, in a selection step, the selected data stream using data stream information of the current scheduling element, and
   wherein if the selection criterion is not fulfilled for the current scheduling element, the scheduling unit is configured to update, in an update step, the current scheduling element, and selects, depending on the order of the plurality of scheduling elements of the scheduling information, another one of the plurality scheduling elements as the current scheduling element.

4. The apparatus according to claim 3,
   wherein the order of the plurality of scheduling elements of the scheduling information is defined such that the plurality of scheduling elements are ordered such that none of the plurality of scheduling elements precedes a first scheduling element of the plurality of scheduling elements, such that none of the plurality of scheduling elements succeeds a last scheduling element of the plurality of scheduling elements, and such that each scheduling element of the plurality of scheduling elements, being different from the first scheduling element and being different from the last scheduling element, comprises exactly one immediate predecessor among the plurality of scheduling elements that immediately precedes said scheduling element, and comprises exactly one immediate successor among the plurality of scheduling elements that immediately succeeds said scheduling element,
   wherein, in the update step, if the current scheduling element shall be not used for determining the selected data stream and if the current scheduling element is not the first scheduling element and is not the last scheduling element, the scheduling unit is configured to update the current scheduling element, and selects, depending on a search direction, the immediate predecessor or the immediate successor of the current scheduling element as the current scheduling element,
   wherein the search direction is either an increasing search direction or a decreasing search direction;
   wherein the scheduling unit is configured to select the immediate successor, if the search direction is the increasing search direction;
   wherein the scheduling unit is configured to select the immediate predecessor, if the search direction is the decreasing search direction.

5. The apparatus according to claim 4,
   wherein the scheduling unit is configured to repeat the determination step and the update step, until the scheduling unit determines that the current scheduling element shall be used for determining the selected data stream, or
   wherein the scheduling unit is configured to repeat the determination step and the update step, until the scheduling unit determines that the current scheduling element shall be used for determining the selected data stream or until a criteria to stop searching is fulfilled.

6. The apparatus according to claim 5,
   wherein the criteria to stop searching is fulfilled, if the search direction is the increasing search direction and if the current scheduling element is the last scheduling element and if the last scheduling element shall be not used for determining the selected data stream, or
   wherein the criteria to stop searching is fulfilled, if the search direction is the decreasing search direction and if the current scheduling element is the first scheduling element, and if the first scheduling element shall be not used for determining the selected data stream.

7. The apparatus according to claim 1,
wherein the scheduling unit is configured to process at least two of the plurality of scheduling elements of the scheduling information in parallel, to determine for each scheduling element of the at least two scheduling elements whether or not the selection criterion is fulfilled for said scheduling element.

8. The apparatus according to claim 7,
wherein the order of the plurality of scheduling elements of the scheduling information is defined such that the plurality of scheduling elements are ordered such that none of the plurality of scheduling elements precedes a first scheduling element of the plurality of scheduling elements, such that none of the plurality of scheduling elements succeeds a last scheduling element of the plurality of scheduling elements, and such that each scheduling element of the plurality of scheduling elements, being different from the first scheduling element and being different from the last scheduling element, comprises exactly one immediate predecessor among the plurality of scheduling elements that immediately precedes said scheduling element, and comprises exactly one immediate successor among the plurality of scheduling elements that immediately succeeds said scheduling element.

9. The apparatus according to claim 1,
wherein the scheduling unit is configured to determine for two or more of the scheduling elements of the scheduling information or for all of the scheduling elements of the scheduling information, whether or not the selection criterion is fulfilled, to acquire a group of one or more scheduling elements, for which the selection criterion is fulfilled,
wherein the scheduling unit is configured to select, depending on the order of the plurality of scheduling elements of the scheduling information, a scheduling element out of the group of the one or more scheduling elements, for which the selection criterion is fulfilled, as a selected scheduling element,
wherein the scheduling unit is to select, as the selected data stream, the data stream which is assigned to said selected scheduling element.

10. The apparatus according to claim 9,
wherein, if the group of the one or more scheduling elements, for which the selection criterion is fulfilled, comprises more than one of the plurality of scheduling elements of the scheduling information, the scheduling unit is configured to select the selected scheduling element out of the group of the one or more scheduling elements, for which the selection criterion is fulfilled, depending on the order of the plurality of scheduling elements of the scheduling information.

11. The apparatus according to claim 1,
wherein the selected data stream is a first selected data stream,
wherein, after the scheduling unit has selected the first selected data stream, the scheduling unit is configured to select another data stream of the plurality of data streams as a second selected data stream, and
wherein, after the transmission unit has transmitted a data unit of the first selected data stream, the transmission unit is configured to transmit a data unit of the second selected data stream,
wherein, after the scheduling unit has selected the first selected data stream, the scheduling unit is configured to modify the counter value, and
wherein, to select the second selected data stream,
the scheduling unit is configured to select, as the second selected data stream, a data stream out of the plurality of selected data streams, which is assigned to a selection element of the plurality of selection elements, for which the selection criterion is fulfilled, depending on an order of the plurality of scheduling elements of the scheduling information,
wherein, to select the second selected data stream, the scheduling unit is configured to determine for at least one scheduling element of the plurality of scheduling elements of the scheduling information or to determine for each scheduling element of the plurality of scheduling elements of the scheduling information, whether or not the selection criterion is fulfilled, depending on the counter value that has been modified by the scheduling unit and depending on the selection information of said scheduling element.

12. The apparatus according to claim 11,
wherein, before or after the scheduling unit has modified the counter value, the scheduling unit is configured to determine a counter comparison result by comparing the counter value with the threshold value;
wherein the scheduling unit is to set the counter value to an initial value, if the counter comparison result is equal to a first counter comparison result; and
wherein the scheduling unit is to not set the counter value to the initial value, if the counter comparison result is not equal to the first counter comparison result.

13. The apparatus according to claim 11,
wherein the apparatus is to select and transmit one or more further selected data streams of the plurality of data streams,
wherein, to select the each further selected data stream of the one or more selected further data streams,
the scheduling unit is configured to modify the counter value, and
the scheduling unit is configured to select, as said further selected data stream, a data stream out of the plurality of selected data streams, which is assigned to a selection element of the plurality of selection elements, for which the selection criterion is fulfilled, depending on an order of the plurality of scheduling elements of the scheduling information,
wherein, to select said further selected data stream, the scheduling unit is configured to determine for at least one scheduling element of the plurality of scheduling elements of the scheduling information or to determine for each scheduling element of the plurality of scheduling elements of the scheduling information, whether or not the selection criterion is fulfilled, depending on the counter value that has been modified by the scheduling unit and depending on the selection information of said scheduling element,
wherein the transmission unit is configured to transmit each data stream of the one or more further data streams that has been selected by the scheduling unit.

14. The apparatus according to claim 13,
wherein the transmission unit is configured to transmit the one or more further selected data streams in a same order as the one or more further selected data streams have been selected by the scheduling unit.

15. The apparatus according to claim 1,
wherein each of the plurality of scheduling elements of the scheduling information is assigned to exactly one of the plurality of data streams.

16. The apparatus according to claim 15,
wherein, for a data stream of the plurality of data streams, two or more of the plurality of scheduling elements of the scheduling information are assigned to said data stream.

17. The apparatus according to claim 1,
wherein the data stream information of the current scheduling element comprises at least one of
a port identifier identifying a port,
a stream identifier identifying the data stream, being assigned to the current scheduling element,
a target node identifier identifying a target node to which the data stream, being assigned to the current scheduling element, shall be transmitted,
a data unit number identifying a data unit of the data stream, being assigned to the current scheduling element.

18. The apparatus according to claim 1,
wherein the apparatus is configured to receive the scheduling information comprising the plurality of scheduling elements,
wherein each of the plurality of scheduling elements comprises scheduling information and data stream information.

19. The apparatus according to claim 18,
wherein the scheduling information further comprises a cyclic redundancy check code which provides check information for the plurality of scheduling elements, and
wherein the apparatus is configured to check whether or not the plurality of scheduling elements are correctly received using the cyclic redundancy check code.

20. The apparatus according to claim 18,
wherein the scheduling information of each scheduling element of the plurality of scheduling elements comprises a slot mask and a slot value for said scheduling element, and
wherein the data stream information of each scheduling element of the plurality of scheduling elements comprises at least one of a port identifier identifying a port, and a stream identifier identifying one of the plurality of data streams, and a target node identifier identifying a target node.

21. A system comprising:
an apparatus for transmitting scheduling information,
wherein the apparatus is configured to transmit the scheduling information comprising the plurality of scheduling elements,
wherein each of the plurality of scheduling elements comprises scheduling information and data stream information, and
an apparatus for transmitting a plurality of data streams, wherein the apparatus comprises:
a scheduling unit for selecting a data stream out of the plurality of data streams as a selected data stream, and
a transmission unit for transmitting the selected data stream,
wherein the scheduling unit is configured to select the selected data stream out of the plurality of data streams depending on scheduling information and depending on a counter value, wherein the scheduling information comprises a plurality of scheduling elements, wherein each of the plurality of scheduling elements comprises selection information and data stream information,
wherein for each scheduling element of the plurality of scheduling elements, a data stream of the plurality of data streams is assigned to said scheduling element, wherein the data stream information of said scheduling element is data stream information for the data stream being assigned to said scheduling element,
wherein for each scheduling element of the plurality of scheduling elements, a selection criterion is either fulfilled or not fulfilled depending on the selection information of said scheduling element and depending on the counter value,
wherein, depending on an order of the plurality of scheduling elements of the scheduling information, the scheduling unit is configured to select, as the selected data stream, a data stream out of the plurality of selected data streams, which is assigned to a selection element of the plurality of selection elements, for which the selection criterion is fulfilled,
wherein, to select the selected data stream, the scheduling unit is configured to determine for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element,
wherein the apparatus for transmitting the scheduling information is configured to transmit the scheduling information to the apparatus for transmitting the plurality of data streams,
wherein the apparatus for transmitting the plurality of data streams is configured to receive the scheduling information from the apparatus for transmitting scheduling information,
wherein the scheduling unit of the apparatus for transmitting the plurality of data streams is configured to select said data stream out of the plurality of data streams as the selected data stream using the scheduling information received from the apparatus for transmitting scheduling information, and
wherein the transmission unit of the apparatus for transmitting the plurality of data streams is configured to transmit the selected data stream.

22. The system according to claim 21,
wherein the transmission unit of the apparatus for transmitting a plurality of data streams is configured to transmit the selected data stream to the apparatus for transmitting scheduling information.

23. The system according to claim 21,
wherein the apparatus for transmitting a plurality of data streams is a first apparatus for transmitting a plurality of data streams, wherein the scheduling information is first scheduling information, wherein the plurality of data streams is a first plurality of data streams,
wherein the system further comprises one or more further apparatuses for transmitting a plurality of data streams, for transmitting one or more further pluralities of data streams,
wherein for each apparatus of the one or more further apparatuses for transmitting a plurality of data streams, the apparatus for transmitting scheduling information is configured to transmit scheduling information for said apparatus for transmitting a plurality of data streams to said apparatus for transmitting a plurality of data streams, said apparatus for transmitting a plurality of data streams is configured to receive said scheduling information from the apparatus for transmitting scheduling information, the scheduling unit of said apparatus for transmitting a plurality of data streams is configured to select a data stream out of one of the one or more further pluralities of data streams as a selected data stream using said scheduling information received from the apparatus for transmitting scheduling information, and the transmission unit of said apparatus for transmitting a plurality of data streams is configured to transmit said selected data stream.

24. The system according to claim 23, wherein for each apparatus of the one or more further apparatuses for transmitting a plurality of data streams, the transmission unit of said apparatus is configured to transmit the selected data stream, selected by said apparatus, to the apparatus for transmitting scheduling information.

25. The system according to claim 21, wherein the scheduling information further comprises a cyclic redundancy check code which provides check information for the plurality of scheduling elements.

26. The system according to claim 21, wherein the scheduling information of each scheduling element of the plurality of scheduling elements comprises a slot mask and a slot value for said scheduling element, and wherein the data stream information of each scheduling element of the plurality of scheduling elements comprises at least one of a port identifier identifying a port, and a stream identifier identifying one of the plurality of data streams, and a target node identifier identifying a target node.

27. A system for transmitting a group of data streams, wherein the system comprises a plurality of communication nodes, wherein each of the plurality of communication nodes is configured to transmit at least one data stream of the group of data streams, and/or is configured to receive one or more data streams of the group of data streams, wherein one or more of the plurality of communication nodes comprise an apparatus for transmitting a plurality of data streams an apparatus for transmitting a plurality of data streams, wherein the apparatus comprises:

a scheduling unit for selecting a data stream out of the plurality of data streams as a selected data stream, and a transmission unit for transmitting the selected data stream, wherein the scheduling unit is configured to select the selected data stream out of the plurality of data streams depending on scheduling information and depending on a counter value, wherein the scheduling information comprises a plurality of scheduling elements, wherein each of the plurality of scheduling elements comprises selection information and data stream information, wherein for each scheduling element of the plurality of scheduling elements, a data stream of the plurality of data streams is assigned to said scheduling element, wherein the data stream information of said scheduling element is data stream information for the data stream being assigned to said scheduling element, wherein for each scheduling element of the plurality of scheduling elements, a selection criterion is either fulfilled or not fulfilled depending on the selection information of said scheduling element and depending on the counter value, wherein, depending on an order of the plurality of scheduling elements of the scheduling information, the scheduling unit is configured to select, as the selected data stream, a data stream out of the plurality of selected data streams, which is assigned to a selection element of the plurality of selection elements, for which the selection criterion is fulfilled, wherein, to select the selected data stream, the scheduling unit is configured to determine for at least one scheduling element of the plurality of scheduling elements of the scheduling information or for each scheduling element of the plurality of scheduling elements of the scheduling information, whether or not the selection criterion is fulfilled, depending on the counter value and depending on the selection information of said scheduling element.

28. The system according to claim 27, wherein at least one node of the one or more of the plurality of communication nodes, which comprise an apparatus for transmitting a plurality of data streams, is a forwarding node being configured, for each data stream of the plurality of data streams, to receive said data stream from a first node of the plurality of communication nodes, and to transmit said data stream to a second node of the plurality of communication nodes, wherein said data stream comprises header information, wherein said header information comprises a stream identifier of the data stream, wherein said at least one node comprises a demultiplexing table which comprises a plurality of table entries for mapping a stream identifier to an output port, and wherein said at least one node is configured to determine the second node of the plurality of communication nodes to which said data stream shall be transmitted using the header information of said data stream and the demultiplexing table.

29. The system according to claim 28, wherein said at least one node is configured to receive two or more of the plurality of data streams from an intermediate node of the plurality of communication nodes, wherein said intermediate node does not comprise an apparatus for transmitting a plurality of data streams.

30. The system according to claim 28, wherein said at least one node is configured to duplicate a data stream of the plurality of data streams to acquire two resulting data streams, wherein, using its apparatus for transmitting a plurality of data streams, said at least one node is configured to transmit the two resulting data streams to two different nodes of the plurality of communication nodes.

31. A motor vehicle comprising the system according to claim 21 or 27.

32. The motor vehicle according to claim 31, wherein the motor vehicle is a car or a motor truck.

33. A method for transmitting a plurality of data streams, wherein the method comprises:

selecting a data stream out of the plurality of data streams as a selected data stream, and transmitting the selected data stream,
wherein scheduling information comprises a plurality of scheduling elements, wherein each of the plurality of scheduling elements comprises selection information and data stream information indicating a data stream being assigned to said scheduling element,
wherein the method comprises selecting a scheduling element out of the plurality of scheduling elements as a selected scheduling element by analysing the selection information of at least one of the plurality scheduling elements depending on a counter value of a counter, and selecting the selected data stream out of the plurality of data streams, so that the selected data stream is the data stream being indicted by the selected scheduling element,
wherein the method comprises determining for at least one scheduling element of the plurality of scheduling elements whether, when analysing the selection information of said at least scheduling element together with the counter value, a selection criterion is fulfilled or not,
wherein the plurality of scheduling elements are arranged in an order,
wherein selecting the selected scheduling element is conducted by selecting a scheduling element out of the plurality of scheduling elements of the scheduling information for which the selection criterion is fulfilled depending on the order of the plurality of scheduling elements.

34. A non-transitory digital storage medium having stored thereon a computer program for performing the method of claim 33 when said computer program is run by a computer.

\* \* \* \* \*